(12) United States Patent
Riggs et al.

(10) Patent No.: US 9,361,358 B2
(45) Date of Patent: *Jun. 7, 2016

(54) SYNTACTIC LOCI AND FIELDS IN A FUNCTIONAL INFORMATION SYSTEM

(71) Applicant: Locus LP, Hamilton (BM)

(72) Inventors: Rory Riggs, New York, NY (US);
Harmon Martin Towson Remmel, New York, NY (US); Jonathan Chandler, New York, NY (US); James Fifield, London (GB); Adelaide Fuller, Brooklyn, NY (US); Sean Sandys, Seattle, WA (US); Gabriel Marius, Bellevue, WA (US); Amy Whitaker, New York, NY (US)

(73) Assignee: Locus LP, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,543

(22) Filed: Jul. 17, 2015

(65) Prior Publication Data
US 2015/0324450 A1 Nov. 12, 2015

Related U.S. Application Data

(60) Continuation of application No. 14/604,272, filed on Jan. 23, 2015, now Pat. No. 9,098,564, which is a division of application No. 14/216,936, filed on Mar. 17, 2014, now Pat. No. 9,880,268.

(60) Provisional application No. 61/802,245, filed on Mar. 15, 2013, provisional application No. 61/801,959, filed on Mar. 15, 2013.

(51) Int. Cl.
G06F 17/30 (2006.01)
G06Q 40/06 (2012.01)

(52) U.S. Cl.
CPC .... *G06F 17/30598* (2013.01); *G06F 17/30241* (2013.01); *G06F 17/30289* (2013.01); *G06F 17/30342* (2013.01); *G06F 17/30424* (2013.01); *G06F 17/30528* (2013.01); *G06F 17/30589* (2013.01); *G06F 17/30592* (2013.01); *G06F 17/30601* (2013.01); *G06F 17/30867* (2013.01);
(Continued)

(58) Field of Classification Search
CPC .................... G06F 17/30289; G06F 17/30342; G06F 17/30424; G06F 17/30528; G06F 17/30598; G06F 17/30601; G06Q 40/06
See application file for complete search history.

(56) References Cited

U.S. PATENT DOCUMENTS 6,868,525 B1   3/2005   Szabo
6,910,044 B2   6/2005   Weinberg et al.
(Continued)

FOREIGN PATENT DOCUMENTS

WO   02/052443 A1   7/2002

OTHER PUBLICATIONS

International Search Report and Written Opinion in PCT Application PCT/US15/12762.
(Continued)

*Primary Examiner* — Jorge A Casanova

(57) ABSTRACT

The invention relates to systems and methods using a logical data model for aggregating data entities in a functional information system supported upon a computing platform, and also for providing systems and methods for analyzing economic information using a functional coordinate system.

30 Claims, 13 Drawing Sheets

(52) U.S. Cl.
CPC .......... *G06F 17/30879* (2013.01); *G06Q 40/06* (2013.01)

(56) References Cited

U.S. PATENT DOCUMENTS

| | | | |
|---|---|---|---|
| 7,003,522 | B1 | 2/2006 | Reynar et al. |
| 7,117,175 | B2 | 10/2006 | Arnott |
| 7,587,352 | B2 | 9/2009 | Arnott |
| 7,620,577 | B2 | 11/2009 | Arnott et al. |
| 7,685,069 | B1 | 3/2010 | Subramanian et al. |
| 7,685,083 | B2 | 3/2010 | Fairweather |
| 7,747,502 | B2 | 6/2010 | Arnott et al. |
| 7,769,653 | B2 | 8/2010 | Rousseau et al. |
| 7,769,663 | B1 | 8/2010 | Subramanian et al. |
| 7,778,905 | B2 | 8/2010 | Arnott |
| 7,792,719 | B2 | 9/2010 | Arnott |
| 7,839,849 | B1 * | 11/2010 | Attig .................. H04L 12/2874 370/389 |
| 7,870,052 | B1 | 1/2011 | Goldberg et al. |
| 7,890,408 | B2 | 2/2011 | Menchero et al. |
| 7,970,684 | B1 | 6/2011 | Benda |
| 8,005,740 | B2 | 8/2011 | Arnott et al. |
| 8,131,620 | B1 | 3/2012 | Steinberg et al. |
| 8,156,154 | B2 | 4/2012 | Taranov et al. |
| 8,306,892 | B1 | 11/2012 | Gross et al. |
| 8,374,937 | B2 | 2/2013 | Arnott et al. |
| 8,374,951 | B2 | 2/2013 | Arnott et al. |
| RE44,098 | E | 3/2013 | Arnott et al. |
| 8,412,609 | B2 | 4/2013 | Lockwood et al. |
| 8,473,911 | B1 | 6/2013 | Baxter |
| RE44,362 | E | 7/2013 | Arnott et al. |
| 8,533,081 | B2 | 9/2013 | Hsu et al. |
| 8,560,414 | B2 | 10/2013 | Arnott |
| 8,645,317 | B1 | 2/2014 | Klimetschek et al. |
| 8,694,402 | B2 | 4/2014 | Arnott et al. |
| 8,805,735 | B1 | 8/2014 | Goldberg et al. |
| 2002/0198885 | A1 | 12/2002 | Streepy, Jr. |
| 2005/0166140 | A1 | 7/2005 | Cai et al. |
| 2005/0171884 | A1 | 8/2005 | Arnott |
| 2005/0197944 | A1 | 9/2005 | Arnott |
| 2006/0149645 | A1 | 7/2006 | Wood |
| 2007/0061266 | A1 | 3/2007 | Moore et al. |
| 2007/0162412 | A1 | 7/2007 | Percy |
| 2008/0301096 | A1 | 12/2008 | Kogan et al. |
| 2010/0145748 | A1 * | 6/2010 | Mayle .............. G06Q 10/06311 705/7.13 |
| 2010/0169758 | A1 | 7/2010 | Thomsen |
| 2010/0274733 | A1 | 10/2010 | Engel et al. |
| 2012/0011118 | A1 | 1/2012 | Gleicher et al. |
| 2012/0166358 | A1 | 6/2012 | Steinberg et al. |
| 2012/0246094 | A1 | 9/2012 | Hsu et al. |
| 2012/0317136 | A1 | 12/2012 | Papish et al. |
| 2012/0327948 | A1 | 12/2012 | Mohandoss et al. |
| 2013/0013608 | A1 | 1/2013 | Bird et al. |
| 2014/0046872 | A1 | 2/2014 | Arnott et al. |

OTHER PUBLICATIONS

Aida Slavic, "Faceted Classification: Management and Use", Jan. 16, 2008.

Vanda Broughton, "A Faceted Classification as the Basis of a Faceted Terminology: Conversion of a Classified Structure to Thesaurus Format in the Bliss Bibliographic Classification, 2nd Edition", Axiomathes (2008), vol. 18, pp. 193-210.

International Search Report and Written Opinion in PCT Application PCT/US14/30825.

Fundamental Indexation, Robert D. Arnott, Jason Hsu, and Philip Moore, Financial Analysts Journal vol. 61, No. 2, 2005.

International Search Report and Written Opinion in PCT Application PCT/US14/30728.

Portfolio Selection, Harry Markowitz, The Journal of Finance, vol. 7, No. 1. (Mar. 1952), pp. 77-91.

A Simplified Model for Portfolio Analysis, William F. Sharpe, Management Science, vol. 9, No. 2 (Jan. 1963), pp. 277-293.

Measuring Predictability: Theory and Macroeconomic Applications, Francis X. Diebold, Lutz Kilian, Journal of Applied Econometrics, 16, 657-669 (2001).

Foundations of Portfolio Theory, Harry M. Markowitz, Nobel Lecture, Dec. 7, 1990.

A Five-Factor Asset Pricing Model, Eugene F. Fama and Kenneth R. French, Sep. 2014.

On Persistence in Mutual Fund Performance, Mark M. Carhart, Journal of Finance, vol. 52, Issue 1 (Mar. 1997), 57-82.

Federal Reserve Bank of New York Staff Reports, "Financial Intermediation, Asset Prices, and Macroeconomic Dynamics," Tobias Adrian, Emanuel Moench, Hyun Song Shin, Staff Report No. 422, Jan. 2010, Revised Sep. 2010.

Illiquidity Premia in Asset Returns: An Empirical Analysis of Hedge Funds, Mutual Funds, and U.S. Equity Portfolios, Amir Khandani, Andrew W. Lo, Jun. 25, 2009.

* cited by examiner

```
<bar-code> ::===
    <ent-bar-code> "::"
    <int-bar-code> "::"
    <first-int-bar-code> "::"
    <second-int-bar-code> "::"
    <para-cust-bar-code> "::"
    <cust-bar-code> "::"
    <cust-wg-bar-code> "::"
    <cust-dept-bar-code> "::"
    <cust-final-bar-code> "::"
    <cust-sub-bar-code> "::"
    <c-of-c-bar-code> "::"
    <c-of-c-wg-bar-code> "::"
    <c-of-c-dept-bar-code> "::"
    <c-of-c-final-bar-code> "::"
    <c-of-c-sub-bar-code>

<ent-bar-code> ::== <ent-locus> <ent-process-marker> <ent-product-marker> <temp-coord-value>

<temp-coord-value> ::== "First" | "Second"
<ent-product-marker> ::== "Resource-Product" | "Activity-Product"
<ent-process-marker> ::== "In-house" | "Outsourced"

<ent-locus> ::=== <long-locus>
<int-locus> ::=== <long-locus>
<first-int-locus> ::== <long-locus>
<second-int-locus> ::== <long-locus>

<para-cust-locus> ::== <long-locus>
<cust-locus> ::== <long-locus>
<cust-wg-locus> ::== <long-locus>
<cust-dept-locus> ::== <long-locus>
<cust-final-locus> ::== <abbr-locus>
<cust-sub-locus> ::== <abbr-locus>

<c-of-c-locus> ::== <long-locus>
<c-of-c-wg-locus> ::== <long-locus>
<c-of-c-dept-locus> ::== <long-locus>
<c-of-c-final-locus> ::== <abbr-locus>
<c-of-c-sub-locus> ::== <abbr-locus>

<abbr-locus> ::== <subject-resource> <activity> <direct-object-resource>
```

FIG. 3-1

```
<long-locus> ::== <subject-resource> <activity> <direct-object-resource> <indirect-object-
resource>

<activity> ::=== <verb>
<verb> ::== "Div" | <phase> "." <department> "." <division>

<subject-resource> ::=== "" | <noun>
<direct-object-resource> ::=== <noun>
<indirect-object-resource> ::=== "" | <noun>

<noun> ::== <resource><resource-stage><resource-stage-value> |
    <resource-human><resource-staging-human> |
    <resource-div> |
    <resource><resource-stage-div> |
    <resource><resource-stage><resource-stage-value-div>

<phase> ::== "1"|"2"|"3"|"4"
<department> ::== "1"|"2"|"3"
<division> ::== "1"|"2"|"3"
<resource> ::== "A"|"B"|"C"|"D"
<resource-stage> ::== "1"|"2"|"3"|"4"
<resource-stage-value> ::== "i"|"ii"|"iii"

<resource-human> ::== "F"
<resource-staging-human> ::== "Work"|"Non-Work"|"Both"

<resource-div> ::== "DivDivDiv"
<resource-stage-div> ::== "DivDiv"
<resource-stage-value-div> ::== "Div"
```

FIG. 3-2

SYNTACTIC LOCI AND FIELDS IN A FUNCTIONAL INFORMATION SYSTEM

CROSS-REFERENCE TO RELATED APPLICATIONS

This application is a continuation of application Ser. No. 14/604,272, filed Jan. 23, 2015, which is a divisional of application Ser. No. 14/216,936, filed Mar. 17, 2014, now U.S. Pat. No. 8,990,268, which claims the benefit of U.S. Provisional Application No. 61/802,245, filed Mar. 15, 2013, and U.S. Provisional Application No. 61/801,959, filed Mar. 15, 2013, the contents of all of which are herein incorporated by reference in their entirety. This application is related to application Ser. No. 14/216,390, filed Mar. 17, 2014, now U.S. Pat. No. 9,069,802, the contents of which are herein incorporated by reference in its entirety.

FIELD OF THE INVENTION

The invention relates to systems and methods using a logical data model for aggregating data entities in a functional information system supported upon a computing platform, and also for providing systems and methods for analyzing economic information using a functional coordinate system.

BACKGROUND OF THE INVENTION

There exist numerous systems for storing data entities for subsequent retrieval. Typically, these systems take the form of an electronic database. Electronic databases are available in numerous types, such as flat file or relational. A relational database is typically a collection of data items organized as a set of formally described tables from which data can be accessed or reassembled in different ways without having to reorganize the database tables.

Information systems can be examined at different levels of abstraction, principally as a physical data model and as a logical data model. As an example of a physical data model, a relational database management system (RDBMS) can be implemented physically using, for example, an indexed file capability executing on an operating system. The RDBMS presents a logical model to its user: one consisting of tables with rows and columns, typically supporting SQL queries and amenable to techniques such as data normalization. While relational databases have proven useful, there are significant limitations to this method of storing data.

In particular, the logical data model does not capture semantic meaning. For example, a relational database table might store city names in multiple rows in a first column and respective population values in multiple rows in a second column. The bare fact that two records may be adjacent provides no information about the relationship between the records. Thus, while useful information can be extracted from a relational database, there is additional semantic value that is not represented in these systems. This semantic information is not inherently captured or represented by existing relational databases.

Furthermore, prior art relational database systems are ill-suited to storing information relating to taxonomies and anatomies. Taxonomies and anatomies are methods for describing a system in which an element's relative and absolute location in the system provides information about the element's specific role or function in the whole system. While this type of information from a taxonomy or anatomy could be stored in an additional field in a relational database, the relationship between the database records still would not provide any information about the relationship between the data entities.

In another existing system, OLAP cubes allow for "spinning and slicing" (pivot table-like) manipulation of N-dimensional cubes of data, and the elements of the N dimensions can be organized as a hierarchy. However, OLAP cubes have several limitations. OLAP cubes are neither well suited for handling variable tree depths nor are they designed to navigate to a component within the N-cube space. Rather, OLAP cubes simply facilitate analysis across the several dimensions. OLAP cubes are also not intended to support sparse matrices where, at some levels, in some dimensions the data is simply not there for valid reasons.

While semantic web technology (such as OWL, OPML, RDF etc.) can represent taxonomies and ontologies and is purposely designed to do so, its focus is on knowledge representation of an ad hoc nature and creating relationships between such ad hoc knowledge. This capability is in part due to the semantic web's having been derived significantly from artificial intelligence approaches to knowledge representation and relationships (famously the "IS-A" relationship—[crimson is-a red] [red is-a color] [color is-a physical-attribute] allowing the conclusion that crimson is a physical-attribute). Notably, however, the semantic web does not readily enable navigation via multiple standardized, ordered coordinates. Furthermore, these semantic web approaches do not attempt to implement or take advantage of domain-specific statistically relevant categories in defining these standardized coordinates as an inherent part of their technology.

The inability to derive semantic meaning from data structures becomes particularly acute when prior art systems operate on unstructured data. While some taxonomies and anatomies have a fundamental data structure, other types of data may appear to be completely unstructured.

For example, there exist various economic taxonomies such as the Global Industry Classification Standard (GICS) developed by MSCI and Standard & Poor's (S&P) for use by the global financial community. The GICS structure consists of 10 sectors, 24 industry groups, 68 industries and 154 sub-industries into which S&P has categorized all major public companies. The system is similar to ICB (Industry Classification Benchmark), a classification structure maintained by Dow Jones Indexes and FTSE Group. This taxonomy, however, has certain limitations. In particular, it does not define relationships common to all companies. Consequently, a user cannot compare two companies' GICS classifications to derive relevant meaning unless they share a common ancestor in the taxonomy. While it allows for great granularity and differentiation between companies, it lacks standardized values for comparison, since the rules for being at one level in a group are unrelated to the rules for being at a corresponding level in another. Thus, comparisons across disparate industries are not possible. Furthermore, the ten sector structure can be criticized as an arbitrary identification of ten sectors; there is not necessarily a relationship between one sector and the next. As a result, storing such data in a relational database table could not provide any additional semantic meaning because the original data entities did not have a consistent and uniform relationship among themselves.

Due to these types of limitations and others, no prior art classification system has been based on clearly defined relationships between the constituent elements because there has not been an underlying data model for the attributes on which that system is based. Additionally, because there has been no underlying model for economics—and even if there had been—there would be no suitable data structure for representing the model.

BRIEF DESCRIPTION OF THE DRAWINGS

FIGS. 3-1 and 3-2 illustrate an example syntax specification.

DETAILED DESCRIPTION

In the following description of embodiments, reference is made to the accompanying drawings that form a part hereof, and which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. The procedures described below could also be executed in different orders. Additionally, various steps that are described below need not be performed in the order disclosed, and other embodiments using alternative orderings of the steps could be readily implemented. In addition to being reordered, the steps could also be decomposed into sub-computations with the same results.

Figure 1:
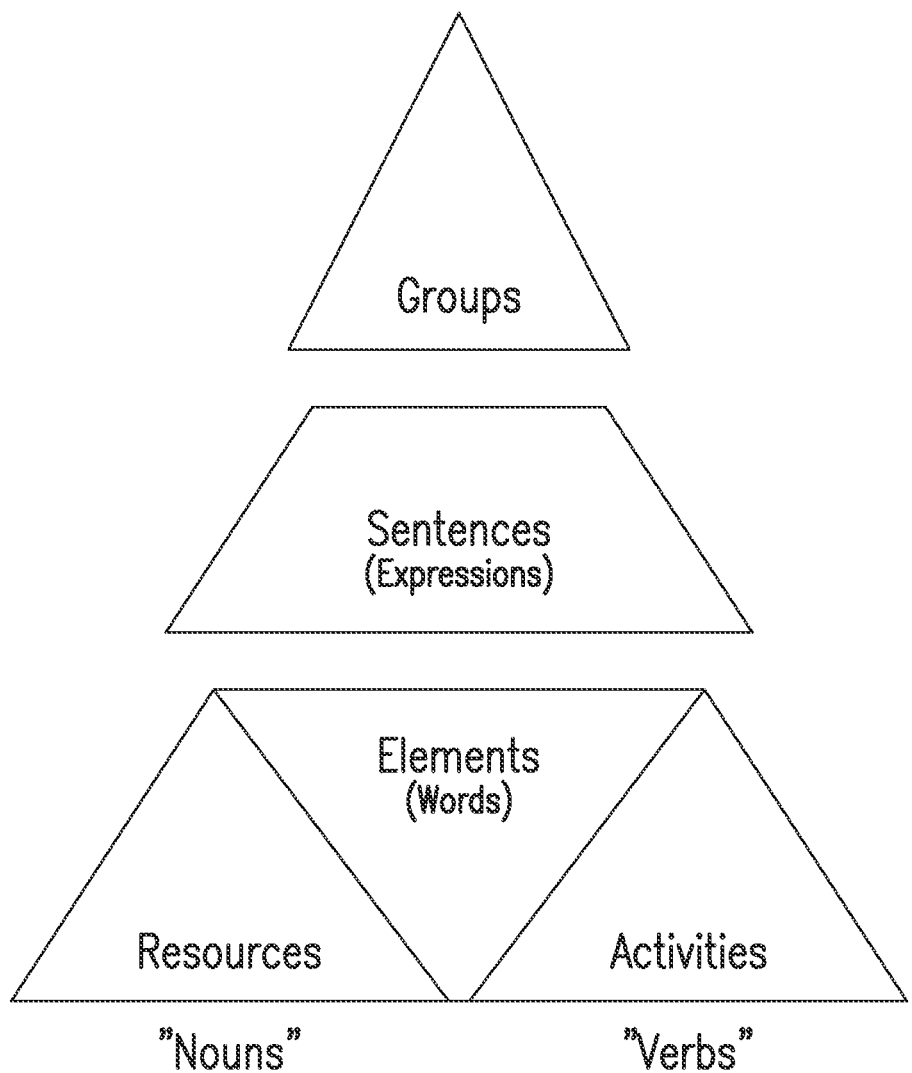
FIG. 1 illustrates an example representation of semantic relationships.

Many problems cannot be adequately addressed simply by frequently issuing a static data query at points in time. This is particularly the case when working, for example, with a high volume data stream. New approaches to data require reframing the data model. Instead of a series of conventional queries that return resulting data, there is a need for contextual queries that enable the user to parse semantic component signifiers related to a plurality of different complex parts of extremely complex systems. Data so represented and queried represents the complexities of natural systems. An example is represented in FIG. 1.

The inventive functional information system can be used to parse through these dense and complex data fields. To accomplish this, the functional information system can subdivide each part, concept or idea into an ordered set of fields, each of which have a defined syntax among themselves and with respect to the values that are used to characterize each signifier.

The inventive functional information system enables these comparative analytics for multiple domains, signifiers, and component values within signifiers across the entire domain of the functional information system. Capabilities of a functional information system can include parsing, identifying, studying, and comparing each part both absolutely and within the context of the whole domain in which the part exists.

Fundamentals of a Functional Information System and Coordinates

The invention includes a logical data model for organizing data entities within a given discipline in which the functional position of each element is identified with respect to the other elements. In order to do this, the invention applies standardized values, called coordinate identifiers, to tag various facets of each element in the domain. These coordinate identifiers classify each facet or element in n-dimensional space. Once data entities are represented in the coordinate space, the ordering of the coordinates enables referencing their semantic meaning based on the locations of the data entities in the coordinate space. It also enables comparison between different data entities along any of the dimensions of the functional information system.

As used herein, a complex system can be a network of heterogeneous components that can interact nonlinearly and, as a whole, give rise to one or more emergent properties or specific outputs. In a complex system, the parts have a functional role in the emergent property or object of the larger system. Systems can be considered to consist of a collection of component parts that fulfill both a role and function in the operation of an overall system. Each of these component parts can have functionally specific operating information related to their specific role, function and performance in the system in which they exist. Processes for systemizing data entities related to parts in a specific system using a systems database are described herein.

Together, through the functioning of these parts, the system as a whole has functionality. The computerized system described herein enables the functional mapping of information related to any arbitrary complex system on a coordinate basis. The functional coordinate system described herein is generally applicable to many domains associated with complex systems including, for example, ecological systems, biological systems, social systems as well as mechanical systems. In one particular example, described in more detail below, the functional information system is applied to economic systems. Similar techniques to those described could be used to extend the system to other domains.

A functional information system can be constructed using coordinate identifiers for the location of components in the system. Location-based coordinate identifiers enable a functional information system that can capture, store, manipulate, analyze, manage, and present all types of functional and operating data for a whole system on a component-by-component basis. In addition, the functional information system can aggregate coordinates into larger groupings, disaggregate larger groupings into smaller groupings, or relate any coordinates that share common attributes. These operations can be performed in real time, past time, or projected time.

The functional information system described herein enables the use of coordinate-based systems to compare components of different systems that otherwise would not be capable of ready comparison. The complex systems modeled may be related to analogous systems. For example, a business is a complex system, as is a human anatomy. Each of these examples has many versions of a basic model. Each of these systems can be represented on a corresponding and analogous coordinate-based system. A coordinate system common across all versions enables coordinate-by-coordinate comparison and analysis.

For example, in economics, it is possible to have common coordinates for all cities, businesses or industries. The system described herein enables a manager of any of these types of complex systems to compare coordinate values to other examples of an analogous type of system, such as an industry, business or city. Furthermore, in a system of systems in which systems on different levels use the same coordinate system, systems databases enable a user to compare differences between systems that are part of one overall system but exist on different levels within the overall system. Systems databases can be used to standardize the vocabulary across a whole system and all of its parts and activities. A systems database can be used to provide a standardized and systematic basis for inter- and intra-system analytics.

Figure 2:
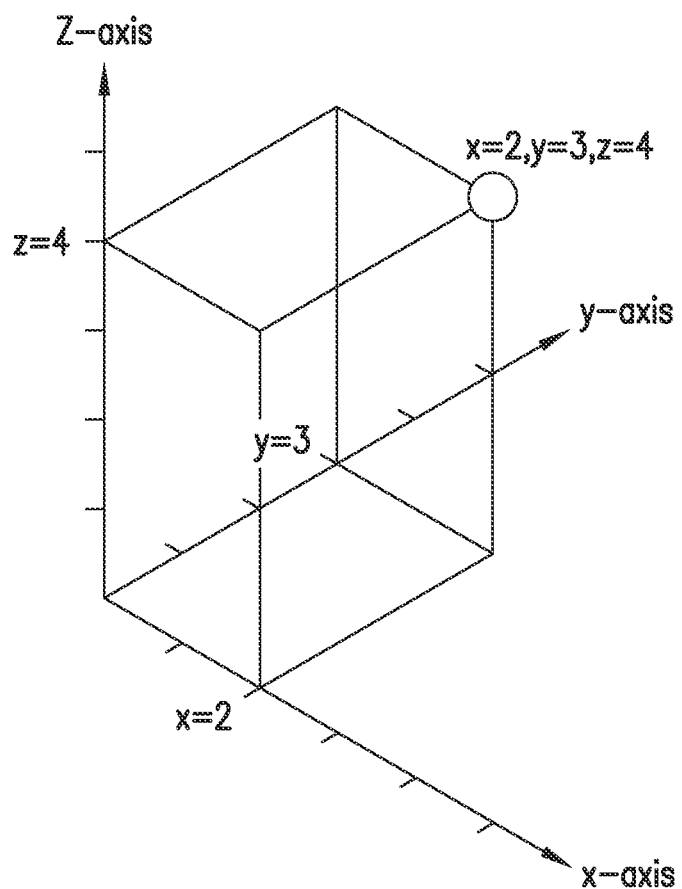
FIG. 2 illustrates an example three-dimensional coordinate system.

The functional information system described herein can operate on each complex system as a functioning whole, while each component of the complex system can be considered to be a functional part of a functioning whole. The functional information system can assign each component a coordinate-based identifier that locates a component in its domain-specific complex system. To represent source data entities in the functional information system, the data entities are assigned systems coordinate values that relate to predefined coordinate locations in the domain-specific system in which the data entities exist, the coordinate values being assigned to reflect the function or role of a facet of the data entity in its domain. A systems database can be constructed using one or more coordinate axes to tag the data entities in the database. An example three-dimensional coordinate system is illustrated in FIG. 2. Coordinate locations are relational values that are based on a coordinate system in which every coordinate can be described with respect to a fixed reference point and to standard increments from the fixed reference point. Together, the fixed reference point and its standardized increments form a coordinate axis. All coordinates on the axis reference either the fixed reference point or a standard increment from the fixed reference point.

The coordinate system for complex systems can be implemented though the functional coordinate system described in more detail below. The functional information system coordinates relate the functional role of one component to the other components of the complex system. The functional information system orders the heterogeneous components of complex systems into a multi-dimensional functional coordinate system in which each coordinate point is the location of a specific functional component of a whole complex functioning system. The coordinates can be used to locate a functional component of a complex system in multi-dimensional space in a functional coordinate system. The coordinate system described herein associates n-dimensional coordinates with the functional role of a specific location in a specific complex system. Domain-specific data can be prepared for representation in the functional information system by decomposing systems into functional component facets. The resultant functional component facets can then be arranged into individual functional coordinate systems, which can then be arranged into a multi-dimensional coordinate system.

The functional information system can represent data in a coordinate system using multi-dimensional constructs using any integer number of dimensions. While some embodiments, as described below, can include four dimensions (e.g., subject resource, activity, direct object resource, indirect object resource), a generalized functional information system can express any integer number of multiple dimensions. In some embodiments, an additional dimension can be added to represent different levels. For a given functional information system, the number of dimensions is determined and fixed prior to applying the functional information system to structure data.

Storing and Extracting Semantic Meaning from the Functional Information System

The coordinates used in the coordinate system are, in and of themselves, semantically meaningful. This characteristic, in combination with multiple dimensions, forms the basis for an essential distinction from taxonomies/ontologies and related systems, which, while potentially attaching meaning to a numbered node within a hierarchy, do not reflect multiple dimensions carrying semantic meaning. The semantic meaning can be assigned either manually or by automated processing.

As a result of the data entities having coordinate values, a data entity in the systems database can be characterized as having semantic value. Within a given dimension, this value can be comprised of: 1) an absolute value based on its coordinate position; and/or 2) a relative value based on its relative position to the other individual elements that exist in the systems. Additionally, each dimension of the functional information system has a semantic value; data entities thus have additional semantic value derived from the dimension in which the coordinate exists. Data entities that have common coordinate values will have common absolute and relative values. Thus, coordinates can have both absolute meaning based on the meaning assigned to that coordinate point and relative meaning based on the meaning defined by the difference between that coordinate point and any adjacent coordinate points.

The coordinates can be semantically meaningful and have semantic relationships. These coordinate tags provide specific relational systems semantics descriptive of each element relative to the other elements and the overall system. As a result, the systems database can be used for operations on systems semantics that relate to the specific system characterized by the specific coordinate systems.

Because the coordinate points are defined semantically, they are bound by predetermined semantic rules. As a result, a rules-based coordinate system is constructed. The rules relate to how to traverse the set. In a functional coordinate system, the increments are rules-based. The rules tell the absolute value and provide location relative to other absolute values. In all of these systems, there is a base value from which the others are referenced. System may be modeled as a coordinate system having axes, but are not required to be modeled as such.

Systems databases can be used to provide data structure by assigning systems coordinates to unstructured elements. The assigned coordinates provide a semantic basis for: 1) an element's specific role or function in a whole system, 2) matching or comparing the role or function of one element to the role or function of another element, 3) tracking the evolution of an element over time both absolutely as well as relative to other elements in the system, and/or 4) comparing similarities or differences (historical, current or future) of one system to another system.

Within this model, the organization of information can be standardized. Each entry in the systems database can specify qualitative information related to its role and function in the overall system. In addition, each entry can specify quantitative measurements that are used to measure its functional requirements and functional performance. The quantitative information entries can represent at least three types of quantitative information:

1) Part specific information,
2) Relational information that links the part to other parts with which it interacts, and
3) Relational information that links the part to the overall system of which it is a part.

As non-limiting examples, the first element (part specific information) can contain the critical operating information and can be compared temporally to track and predict performance. The second element (relational information that links the part to other parts with which it interacts) tracks the balance of the specific part within the operation of the system itself. The third element (relational information that links the part to the overall system of which it is a part) tracks the operation relative to the system as a whole and all its other parts. Together, these three information modules can provide operational information relative to each individual part as well as each part's role and operations within the larger system.

Coordinate-Based Identifiers Representing Cardinal Identifiers

A pre-defined functional arrangement provides a primary building block for a functional coordinate system. A functional arrangement can be converted into a functional coordinate system by defining a fixed reference point and assigning coordinate identifiers to each of the components of the functional arrangement. In some embodiments, the coordinates in the functional information system can represent functional arrangements of domain-specific data entities.

A functional arrangement is a functional sub-grouping of a set of interconnected functional activities (or objects) in which each sub-group fulfills a defined functional role as part of a whole system and the internal order of the functional sub-grouping is derived from the temporal or physical sequences in which the sub-groups perform these activities. A functional sub-group can possess a unique functional value that, together with the other sequential functional groups, enable a whole function value associated with the functional arrangement. Each sequential location is specified relative to a fixed reference point, such as the first sub-grouping or the last sub-grouping of the set. As such, each functional arrangement defines a specific functional coordinate system.

Functional Coordinate Representation (Regarding N-Tuples and Dot Notation)

The systems and methods described herein can represent coordinate points and cardinal identifiers using n-tuples and dot notation. This notation captures the specific notion of ordered coordinates as used in the functional information system. N-tuples are commonly illustrated by using small sets of ordered symbols, often alphabetic or numeric. N-tuples are also inherently discrete (being a set of elements). An n-tuple can be an ordered set of n symbols. For example, the sets (1, 2, 3, 4) and (A, B, C, D) are both 4-tuples.

The n-tuples can be represented in n-dimensional coordinate space. Furthermore, each dimension of the coordinate system can be expressed as one or more n-tuples, which are ordered (consistent with mathematical definition of N-tuples); typically n-tuples in an FIS consist of alpha or numeric symbol sets.

Each n-tuple can have semantic meaning within the n-tuple set and such semantic meaning is of a level of generality comparable to its peers within the n-tuple.

Each n-tuple can also express a hierarchical semantic relationship in relation to other n-tuples of the dimension. This expression represents successive specialization. For example, (2,2,1) and (2,2,3) can be further specializations of the partial coordinate (2,2).

Application of Functional Information Systems to Hierarchical Classifications

The functional information system can also be used to represent hierarchical classification systems. An information system for characterizing a specific system typically organizes the operating information in a hierarchical manner, with the ultimate parent being the system itself and each lower level grouping relating to ever-smaller sub-systems of the parent. The organization of the hierarchy is generally anatomically organized, such that the upper-most grouping reflects the major sub-systems and each lower level grouping is a sub-system of the anatomical parent. By definition, in a system there exist a finite number of upper-level sub-systems, each upper-level sub-system having a finite number of sub-systems. For example, organizational charts for a business and anatomies in biology are typically organized in this manner.

As a non-limiting example, hierarchical levels can include Global Economic Systems, Sub-Global Economic Systems, Industrial Groups, Enterprise, Departments, Work Groups, and Labor. In this example, a given enterprise or department could be associated with a specific coordinate in the coordinate system. For example, a given enterprise or department could be associated with a specific coordinate in the coordinate system.

The functional information system can support an arbitrary number of hierarchical classifications to which the coordinate system is applied for any given domain. As a result, the functional information system applies a multi-dimensional, semantic coordinate system to one or more hierarchical classifications. As an alternative example, biological systems can be represented by hierarchies reflecting both phylogeny (species, sub-species etc.) and anatomy/systems biology, with a single human skin cell sharing a portion of its sub-coordinates (nucleus, cell wall components) with a single cell amoeba, despite the single cell occupying very different positions with respect to the two hierarchies.

In a hierarchical coordinate-based information system, a coordinate identifier can identify a sub-set of the whole system with specific attributes related to its coordinate sub-set. All components assigned to a common coordinate sub-set can share component-specific attributes related to the attributes of the coordinate sub-set. In a multi-dimensional coordinate system, components assigned to a location in a system will share attributes of multiple intersecting coordinate sub-sets. This capability results from the use of coordinate-based identifiers where each coordinate value is a class value where the class is defined as the specific coordinate-based sub-set. Each location has attributes related to each of its coordinate identifiers related to its specific location in n-dimensional coordinate space. The attributes for each point reflect each of these sub-set coordinate values and can be organized using any one or more classes of coordinate sub-sets. A user can examine a specific location in a system or examine a broad aggregation of locations using multiple coordinate values.

The coordinate-based systems can be used to compare analogous components of analogous systems. The system described herein can support many members in a grouping of analogous complex systems and thereby enable comparability of analogous components of complex systems of the same type.

System Implementation in Logical Data Models

The invention includes a database system and related data model aimed at supporting complex queries on complex interrelated data feeds.

As an initial matter, it is helpful to distinguish between a logical data model/database and a physical data model/database. In some embodiments, the logical models and databases comprising the coordinates described herein can be implemented in a relational database. The systems and methods described herein can include a translation module which reads and writes information using an RDBMS data model and related navigation (tables, SQL) associated with relational databases and presents the information to a user using coordinates representing functional components.

According to the present invention, a multi-dimensional database can be represented as a relational schema in the relational database. The multi-dimensional database can have one or more dimensions having one or more members. Each value in the multi-dimensional database is identified by the intersection of one member from each dimension.

The system described herein can be implemented in a multi-dimensional database. Generally, the multi-dimensional database is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge.

One example application of the logical data model can be applied to the classification of companies. As described above, GICS provides a hierarchical classification of companies without reference to an underlying economic system.

Syntax for Representing the Logical Data Model

The functional information system data model utilizes a common syntax that is generalizable and comparable across many data points that are associated with this common syntax. The syntax can capture a grammar which, along with a lexicon embodied in the coordinate system, gives rise to greater semantic functionality.

In some embodiments, the lexicon can be constructed from domain-specific functional arrangements, while the syntactic rules characterize the dimensions of the functional information system.

A Syntax for a Generalized System

The functional information system data model can utilize a syntax that is imposed on the coordinate system. While a subject, activity, object form proves useful in many domains, such syntax can be of any form. Thus, a locus can be based generally on a syntax imposed on the functional information system coordinates in combination with other syntactic and/or semantic elements (such as, for example, Product, Intermediary/Customer, etc., as discussed below.)

The loci can be combined to form a bar code. In some embodiments, such as those described in more detail below, the bar code can be a 15-tuple of loci. Each of the 15 coordinates of this tuple can be filled with values drawn from functional information system coordinates. Additional generalizations are possible. For example, a bar code can be defined as a group of field and coordinate pairs where each pair as a corresponding locus. This type of bar code allows creation of a different bar code for different types of entities.

The functional information system creates coordinates, loci, and bar codes based on values from underlying sets which are then combined according to certain syntactic rules, as described in more detail below. In some embodiments, these sets may be functional arrangements. The values of the elements of these underlying sets have semantic meaning. These values can have meaning both inherently with how they relate to the other values and the set as a whole.

The bar code system disclosed herein can be utilized in conjunction with syntactic tagging systems and can be used in the creation of a related dictionary as well as domain-specific syntactic structures that have domain-specific names. The related discipline of syntactic tags can be used to create the component elements. A bar code can be created by combining multiple component elements selected from one or more specific domains.

In any domain, the identification of any data entity involves identifying a specific position in a domain and relating it to other positions. A bar code can be used to link domain-specific syntactic positions to other syntactic positions in a domain through a system of nested syntactic positions thereby enabling identification and naming of complex domain-specific structures. For example, a car, a steel girder, a barber, and a semi-conductor manufacturer can be identified using the bar code structure by linking together related domain-specific positions (sometimes in multiple domains on multiple levels). This ability to name domain-specific complex parts of complex systems is enabled by the bar code.

Autoclassification can be used in connection with the bar code. A dictionary of domain-specific terms can be created, wherein the terms are defined syntactically through the bar code. Then algorithms can be created that match these domain-specific, syntactically-defined, terms to existing terms in a domain and, thereby, create a domain-specific functional information system on an automated basis. These methods can be interrelated by employing syntactic tagging technology in the bar code method, and employing the bar code method in the autoclassification method. These methods can be used in a wide variety of disciplines and are not necessarily unique to any particular field of study. Rather, they may be broadly applicable to any domain. For example, in many of the scientific domains, the bar code can be used to provide a pathway to a unified record system for the domain-specific parts of their domain that is both dynamic and relational.

A Domain-Specific Syntax

A domain-specific syntax can be defined and created by the method described below.

A set of rules can be created that can be used to 1) generate valid syntactic tags; or 2) determine if a syntactic tag is valid or not.

These rules can be expressed in BNF notation, or an equivalent notation.

The valid expressions (or sub-expressions) in the syntax that have a range of potential values (in the BNF, expressions that have multiple options separated by "or"s) and can have properties including:

1) They describe a dimension in a discrete multidimensional space consisting of the dimensions associated with all such elements. There may be spaces in the bar code where a specified range of acceptable values (for example, in the enterprise locus resource category space), A, B, C, D, E, or F can be placed. So {A, . . . , F} describes a dimension in a discrete multidimensional space. Another example dimension could be resource stage, taking on values 1 to 4, or sub-stage, with values i to iii, or in the activities, as described in more detail below.

2) They can be hierarchically organized, so the dimension described above consists of regions and successive subregions within the multi-dimensional space. Thus, the activity and resource values can be subdivided.

A Syntax for an Economic System

As discussed above, elements of the underlying sets can have semantic value expressed as relationships between the elements. As a non-limiting example, the order of the underlying sets gives rise to the order relationship, which informs about the semantic meaning "which thing came first".

The systems described herein can include one or more dimensions, each dimension comprising an axis that characterizes a facet of the domain-specific data along a functional arrangement. For example, one axis can be the "activity" axis, which can be considered to be an ordered set of 36 activities, for example {1.1.1, 1.1.2, ..., 4.3.3}, under the ordering 1.1.1<1.1.2<...<4.3.3. Another axis can be used to describe "resource" categories, {A, B, C, D, E, F}, under the ordering A<...<F. The system can also include resource stage and substage axes, which are {1, 2, 3, 4} and {i, ii, iii} under the orderings 1<2<3<4 and i<ii<iii, respectively.

In each axis, there may be defined relationships between the elements. One such type of relationship is order. These relationships can carry semantic value, allowing data entities to be meaningfully compared.

Given these axes, coordinate 10-tuples can be formed as <resource-category, resource-stage, resource-substage, activity, resource-category, resource-stage, resource-substage, resource-category, resource-stage, resource-substage>. The first three coordinates can be referred to as the "subject resource", the next as the "activity" or "verb", the next 3 as the "object resource", and the final three as the "indirect object". In some embodiments, described in more detail below, the syntax can capture <subject resource><activity><object resource> in the syntax. However, these elements are not required.

Similar to the way that the activity set can be considered to be {1.1.1, 1.1.2, 1.1.3, ...}, the resource, resource-stage and resource-stage-value sets could be combined into a single set {A1i, A1ii, A1ii, A2i ...}. This might make sense if there are additional rules on how any tuples are constructed in that not all combinations are valid, i.e. (F, 1, ii).

Alternatively, activities could be considered as 3-tuples taken from 2 separate ordered sets, one being {1,2,3,4} and the other being {1,2,3}, where each activity is dot notation of a 3-tuple <activity-phase, activity-division, activity-department>, with phase coming from the first activity axis and division and department from the second axis. The activity value in the coordinate is then a 3-tuple (elements of tuples can be other tuples). The activity can be considered as being drawn from an ordered set of 36 activities, and the coordinates as 10-tuples. Coordinates could also be considered to be 12-tuples, instead of 10-tuples, with 3 values for activity instead of just 1.

Loci can then be formed as tuples of coordinates plus contextual markers. Contextual markers can be configured to appear based on the locus being queried. Similarly, some loci will not have subject resources or indirect objects. Provisions can be made for div and the different F stages/substages, as described in more detail below. A locus can take on the structure of some n-tuple (coordinate value, marker 1, ..., marker m) with the coordinate value being a 10-tuple as discussed above followed by m markers, each drawn from a finite set of permissible markers.

In one example embodiment, bar codes can be formed as 15-tuples of loci: (enterprise locus, integration locus, first intermediary locus, second intermediary locus, customer subordinate resource locus, customer final resource locus, customer work group locus, customer department locus, customer enterprise locus, parallel customer locus, customer of customer subordinate resource, customer of customer final resource, customer of customer work group locus, customer of customer department locus, and customer of customer enterprise locus). These embodiments can include an expanded number of axes used to form these loci or separately defined schema for each locus instead of just one general locus schema.

The relationships expressed by the syntax can include, but are not limited to, order, subdivisions/successive specialization, pre/central/post, complementary, nodal/connecting, and sublevel/level. A summary of selected relationships is provided below.

Activity Relationships

Order: 1.1.1<1.1.2<...<4.3.3. This indicates, in a given cycle, what activity happens before another. In the language of cardinal identifiers, the lower-valued activity is required to take place before the higher-valued one can.

Subdivisions/Successive Specialization: 1.1.1, 1.1.2, and 1.1.3 share the "1.1" property. Indeed, all a.b.1, a.b.2, and a.b.3 are related for any fixed values a and b. Similarly, all a.1.*, a.2.*, and a.3.* share a property for any fixed value a, and any value *. (That is, all 9 activities in phase 1, from 1.1.1 to 1.3.3, share some property of the parent phase). This relationship can express nearness. This relationship is also useful for higher level analysis without unnecessary detail, i.e. consider only 12 activities, suppressing the 3rd level of granularity.

Pre/Central/Post: All *.*.1 activities are share a common characteristic of "pre-ness", for any values of *. The value of "1" can be used to indicate "pre". Similarly, all *.*.2s are related (having a "central-ness" attribute), and all *.*.3s ("post-ness"). Similarly, at a higher level, there are relationships between the *.1.*s, as well as the *.2.*s and *.3.*s.

Complementary: Activities "across" from each other are related. That is, 1.1.1 and 3.1.1, 1.2.2 and 3.2.2, 2.2.2 and 4.2.2, etc. share at least some characteristics.

Nodal/Connecting: Moving through the set in order, activities alternate between being "nodal" and "connecting", which have semantic meaning 1.1.1, 1.1.3, 1.2.2, ..., and 4.3.2 (all activities where sum-of-digits is odd) are all connecting activities; 1.1.2, 1.2.1, ..., 4.3.3 (sum-of-digits even) are nodal.

Resource Relationships

Order: Within the levels/sublevels, there is an order: 1i<1ii<1iii<2i<...<4iii. The resource categories, A<B<...<E, can also be ordered. Those can be treated lexicographically, so A1i<...<A4iii<B1i<...<B4iii<...<E4iii. F can be considered separately.

Subdivision: All abi, abii, and abiii activities are related, for any fixed values a and b. Similarly, all a1*, a2*, a3*, and a4* are related, for fixed a and any *. This is analogous to the subdivision relationship in activities.

Sublevel/Level: Across all resource categories (A-E), and all levels (1-4), the individual sublevels (i-iii) are related. That is, there is a relationship between all **i resources (sublevel i has semantic value). Similarly, across all resource categories and regardless of sublevel, the level has some inherent meaning (i.e., all level 2 resources share a property, all level 2 resources, etc.) This is analogous to pre/central/post.

The relationships described above can also be described using a formal framework:

Activity Relationships

Order: {(a.b.c, d.e.f) such that (a<d) or (a=d and b<e) or (a=d and b=e and c<f)}

Subdivision:

Department level: {(a.b.c, d.e.f) such that a=d and b=e}

Division level: {(a.b.c, d.e.f) such that a=d}

Pre/central/post:

Department level: {(a.b.c, d.e.f) such that c=f}

Division level: {(a.b.c, d.e.f) such that b=e}

Both: {(a.b.c, d.e.f) such that b=e and c=f}

Complementary: {(a.b.c, d.e.f.) such that a+d is even, b=e, c=f}

Nodal/Connecting: Nodal={(a.b.c, d.e.f) such that a+b+c and d+e+f are both even}; Connecting=not nodal={(a.b.c, d.e.f) such that a+b+c and d+e+f are both odd}

Resource Relationships

Order: {(abc, def) such that (a<d) or (a=d and b<e) or (a=b and d=e and c<f)} where the orderings on the resource categories and stages are natural, i.e. A< . . . <E, i<ii<iii.

Subdivision:
Sublevel: {(abc, def) such that a=d, b=e}
Level: {(abc, def) such that a=d}
Level/Sublevel
Sublevel: {(abc, def) such that c=f}
Level: {(abc, def) such that b=e}
Both: {(abc, def) such that b=e and c=f}

Syntax Notation

As a non-limiting example, the various syntax expressions of locus coordinates described herein can be expressible in BNF (Backus Normal Form or Backus-Naur Form) or similar techniques for expressing context-free grammars, such as van Wijngaarden form. As such, the syntax can be fully generalizable. As a non-limiting example, the syntax can be used to provide successive definitions of coordinates, locus, loci and generalized abstractions for the concepts of levels and domains in any discipline represented in the functional information system, including those relating to economics and business.

The syntax specification can be a set of derivation rules, written as <symbol>::=_expression_where <symbol> is a nonterminal, and the_expression_consists of one or more sequences of symbols; more sequences are separated by the vertical bar, '|', indicating a choice, the whole being a possible substitution for the symbol on the left. Symbols that never appear on a left side are terminals. On the other hand, symbols that appear on a left side are non-terminals and are always enclosed between the pair <>. The '::=' means that the symbol on the left must be replaced with the expression on the right.

An example using some of the constructs is provided in FIGS. 3-1 and 3-2.

In some embodiments, the syntax can be defined using XML or another means of description.

System Implementation in Physical Data Models

The systems and methods described herein can be implemented using any number of physical data models. In one example embodiment, an RDBMS can be used. In those embodiments, tables in the RDBMS can include columns that represent coordinates.

In the case of economic systems, data representing companies, products, etc. can be stored in tables in the RDBMS. The tables can have pre-defined relationships between them. The tables can also have adjuncts associated with the coordinates.

Using the RDBMS, searches can be executed for common coordinates.

An example table for use with economic systems is illustrated below.

| Locus1 | L2 | Ln | Entity type (business, product, jobs, government, etc.) Could be a letter. | Entity ID (unique reference link to a row in another table (Table 2)) |
|---|---|---|---|---|
|  |  |  |  |  |
|  |  |  |  |  |

| Entity Table 2 |||
|---|---|---|
| Entity ID (same value as the Entity ID reference link) | Any data that should be associated with the entity | Entity name |
|  |  |  |
|  |  |  |

When a record is created in Table 1, it employs the Entity ID that is created by the insert operation on table 2.

Any other relational database could be used, such as NoSQL, that does not follow a fixed schema. Tables could be bridged across multiple machines. Using NoSQL, the system could be implemented in one table.

Access, Retrieval, and Analysis Capabilities Enabled by the Functional Information System The functional information system enables a range of novel capabilities arising from the combination of multiple dimensions that capture semantic meaning. These capabilities are further facilitated by other characteristics of the system, such as the fact that the coordinates comprise ordered N-tuples which can describe successive specialization (among other features).

Contextual queries enable the user to parse semantic component signifiers related to plurality of different complex parts of extremely complex systems. Data so represented and queried represents the complexities of natural systems.

Access, retrieval, and analysis can be performed based on the following relationships deriving from the coordinate representation of the data entities:
1. degree of difference,
2. successive details (drill down analysis),
3. functional relationships based on the semantics of the coordinates, and/or
4. same, similar, roughly similar (possibly across levels, for example, in economic systems, transportation companies vs. transportation functions of a department), The system supports notions of functional equivalence across representations of dissimilar real world domains by enabling different coordinate systems to be related to one another. For example, accumulated energy principles can be related across both biological and economic systems within the system. As another example, a geographic coordinate system and a social graph coordinate system can be related via mobile location to provide a useful social service system.

The functional information system supports interrelationships between similar domains based on the identification of multiple fixed points in common between the coordinate systems for those domains. For example, functional aspects of systems biology can be linked to human biological systems.

User Interface Embodiments Enabled by the Coordinate System

Because the coordinate system is ordered, it can be mapped onto similarly ordered user interface expressions. In the economics/business expression of the system described below, this mapping can take the form of mapping the coordinates into the color spectrum, which itself is ordered (though color is continuous, so the functional information system adopts discrete shades as the basis for the mapping). See also matrix/tree representations of information/data as examples.

A Functional Information Systems (FIS) for Economic Systems

As described above, a complex system can be represented in the functional information system once the base information is translated into a functional coordinate system. These generalized rules described above for the organization information systems for systems can be applied in a wide range of disciplines, including human anatomy and business. An anatomy defines a finite number of systems that are all connected, having absolutes, operational connections and overall relationship. Any system that is based on an underlying anatomy having these characteristics can be represented using these methods.

The architecture can be used to provide a multi-dimensional coordinate system that associates, or tags, each of the parts of a system according to their role and functional location in the overall system. This coordinate system creates a system of general systems markers. While a typical coordinate system can only be used to map a physical location in two-dimensional space, the systems markers describe points on a functional map based on characteristics such as the order of occurrence and the type of physical parts required when performing a specific function at a specific functional location. This functional coordinate system uses fixed reference points and standardized increments from these reference points to characterize the system markers.

The approach described below uses the mapping of economic information as the practical implementation of the generalized coordinate-based information system described above. Economics as a domain does not have a generally accepted model for the organization of its parts. The application of the FIS described above to an economic system illustrates both the operation of the FIS as well as how different domains could use the methodology to develop a coordinate-based information system. In addition, it illustrates how adopting a coordinate-based system for a domain of study fundamentally changes the information systems used by the domain.

It creates the possibility of having common coordinates for all cities, businesses or industries. A manager of any of these analogous types of complex systems could compare coordinate values to other examples of analogous systems such as an industry, business or city. Among other things, it would enable transparency across systems, real-time comparative analysis and optimization models for any type of economic system. This would be true of any domain that adopted a functional coordinate system.

In many domains, like economics, there does not exist a structural model of an underlying system. This means that there is also no structural model for the information related to these systems. It is the structural models for underlying systems that provide structural models for the information systems related to the underlying system. The functional information system provides a tool for these domains to develop coordinate-based systems that could then be modeled and examined from many different aspects.

For example, domains that rely on geographic information benefit from the coordinate-based infrastructure associated with geo-coordinates. These domains have a tremendous number of tools available to them because of the GIS systems enabled by these coordinates. All of these tools would also be available to domains with functional coordinate systems.

The systems and methods described herein can be used to classify the business attributes of companies according to a standardized economic model. The classification system described herein can be rules-based. The systems and methods for structuring data include a language which syntactically integrates coded nouns (resources) and verbs (activities). The nouns are coded and the verbs are coded and, as a result, sentences are coded, resulting in a classification language based on syntactically ordered coded words. A graphical illustration of this arrangement is presented in FIG. 1.

The syntactically ordered coded words are coordinates in the system for structuring data. As discussed in more detail below, a bar code data structure can be used to organize the coordinates and their intersections into coordinate groups. The bar codes enable parts of an economy with shared coordinates to be linked. A representation of an example bar code structure is illustrated in FIGS. 3-1 and 3-2.

The bar codes contain information that enables viewing each company as: 1) a supplier; 2) a customer; 3) a product; or 4) as one of several dictionary terms. The ability to have a syntactical organization of these many standardized values contained within a single classification tool is unique to the approach described herein.

The analysis of an economic system, and its representation in a systems database, begins with identifying the component parts of the system. Resources and activities are discussed first.

Resources

All objects used in an economy can be classified in one of six resource categories: information (e.g., knowledge and ideas), capital (e.g., currency and finances), energy (e.g., fuel and food), labor (e.g., collective, work groups), real estate (e.g., facilities and shelter), and tools (e.g., clothing and equipment). The tools, information and real estate can be considered to be operating resources, and the labor, energy, and capital can be considered to be enabling resources.

Figure 9:
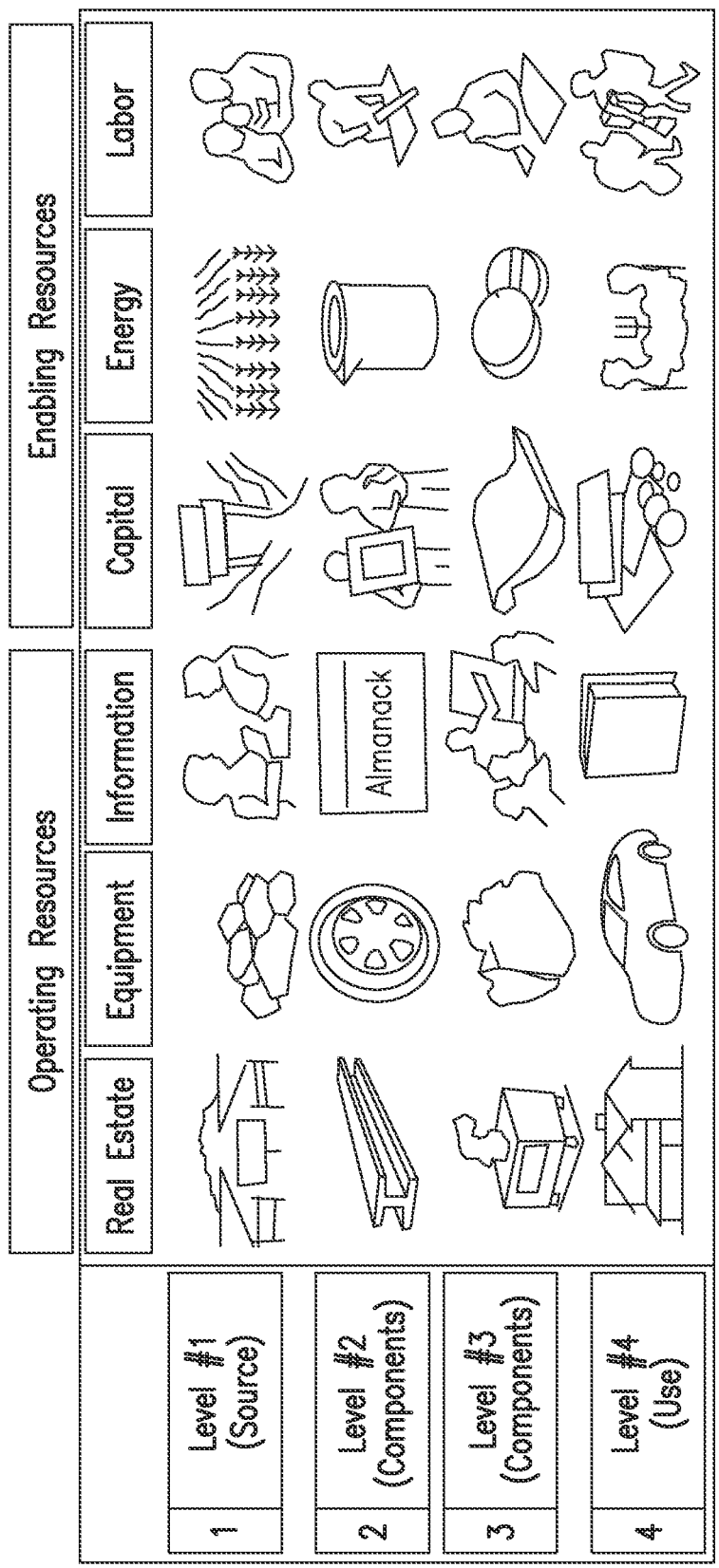
FIG. 9 illustrates an example arrangement of resources.
Figure 10:
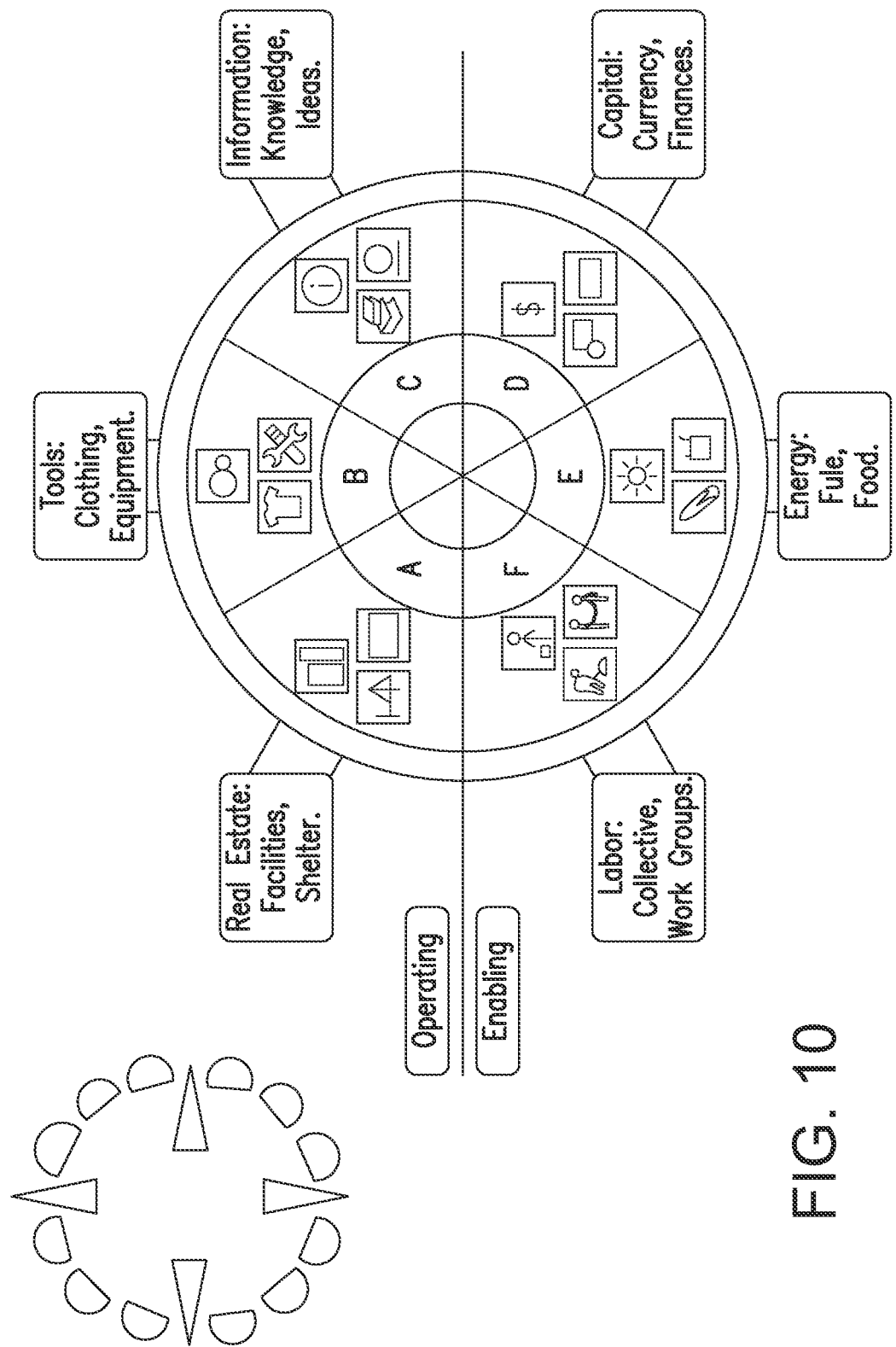
FIG. 10 illustrates example relationships between operating and enabling resources.

The resources can be associated with a corresponding letter. As a non-limiting example:
A. Real estate
B. Tools
C. Information
D. Capital
E. Energy
F. Labor These resources form a functional arrangement of economic resources. FIG. 9 illustrates an example arrangement of resources.

Activities

As used herein, activities are the actions which resources perform on other resources. Every action which takes place in the economy can be classified according to a set of standardized activities.

Activities can be considered to be part of a product cycle or a money cycle. The product and money cycles can each be composed of an input phase and an output phase. This results in four separate phases: an input product phase (for purchasing and providing all inputs necessary to produce the product), an output product phase (for producing the product), an input money phase (for selling the product and earning money for future operations), and an output money phase (for deciding on how to use this money).

Figure 4:
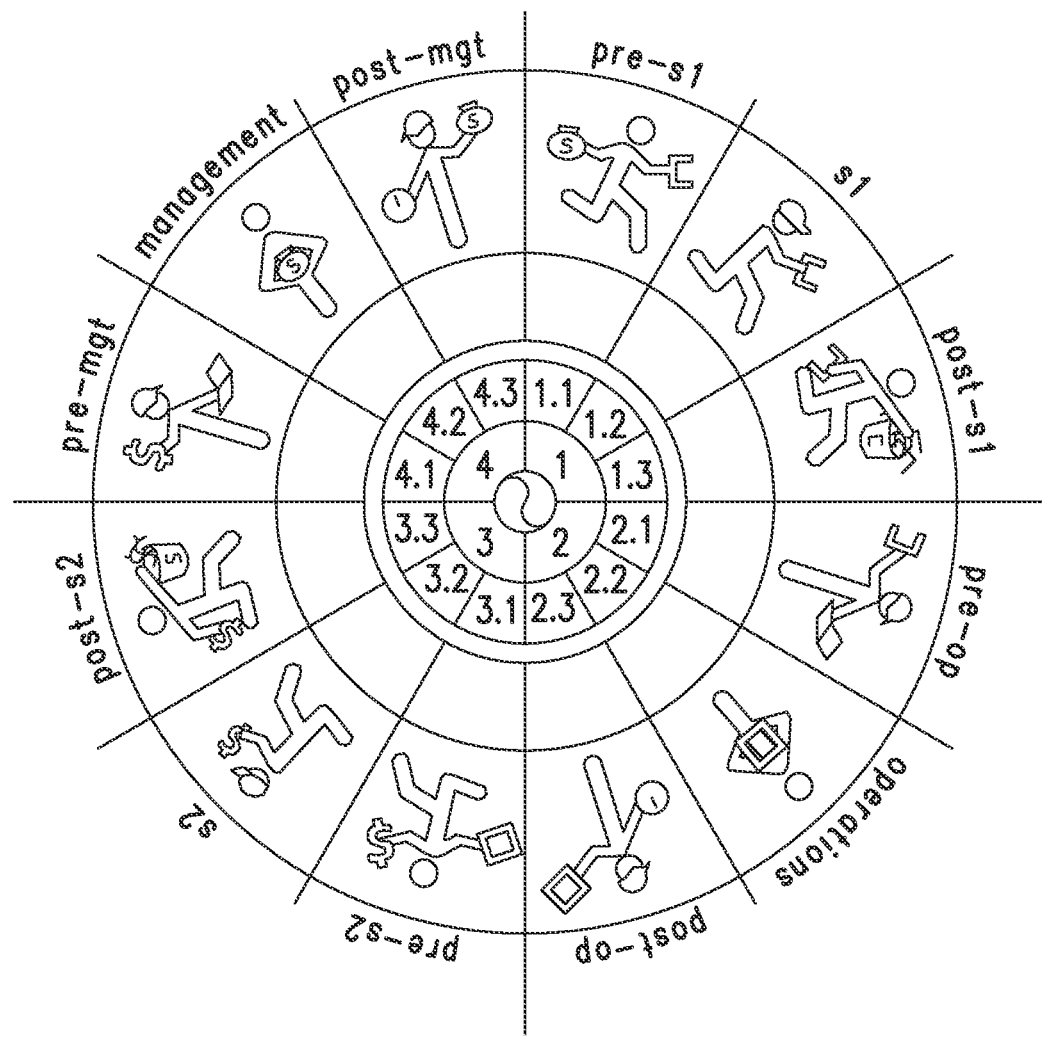
FIGS. 4-5 illustrate example activity wheels.
Figure 12:
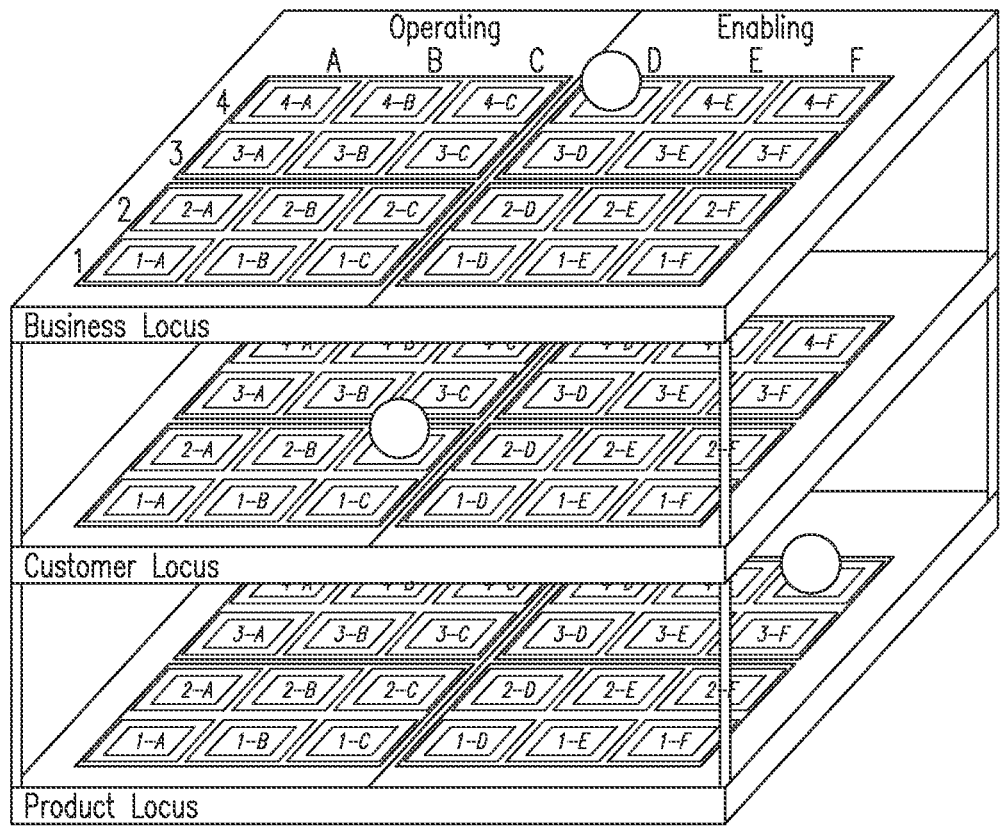
FIG. 12 illustrates example relationships between activities and resources.

Each of the four phases can be further subdivided into three activities including pre, central, and post activities. These activities include:
1. Input Product Phase
1.1 Procurement
1.2 Transportation
1.3 Infrastructure
2. Output Product Phase
2.1 Product Design
2.2 Production
2.3 Quality Control 3. Input Money Phase
3.1 Sales
3.2 Money Transfer
3.3 Financing
4. Output Money Phase
4.1 Investment Design
4.2 Management
4.3 Budgeting These 12 activities are illustrated mapped onto an activity wheel in FIG. 4. A company can be considered to perform any or all of the 12 activities on an object resource. FIG. 12 illustrates the relationships between activities and resources across multiple loci.

Figure 5:
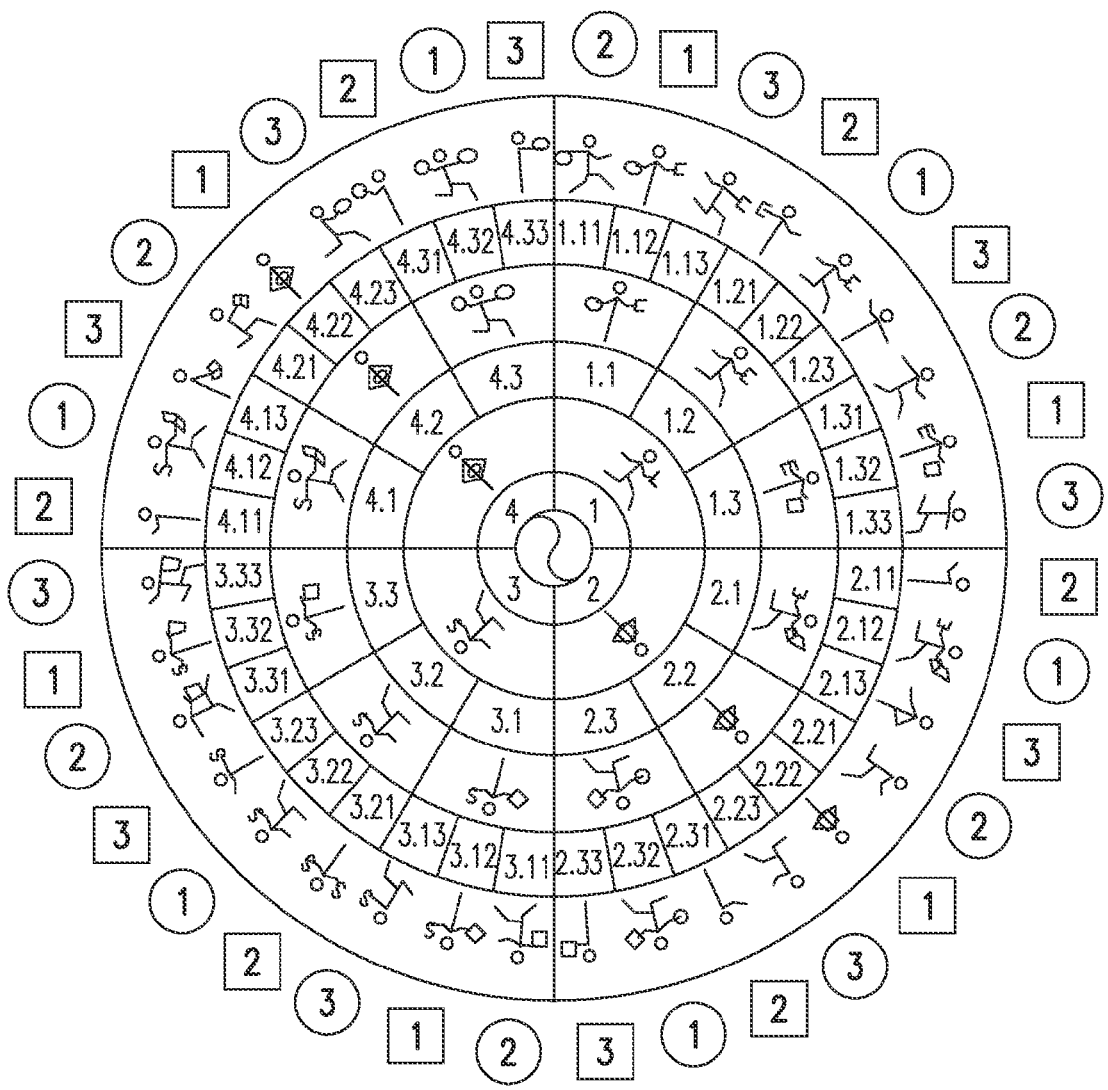

In some embodiments, every activity may always be able to be further subdivided into three activities including pre, central, and post activities. Thus the 12 activities can be thought of as 36 activities, as illustrated in FIG. 5, or as 108. In some embodiments, this subdivision is infinitely possible.

These activities form a functional arrangement of economic actions.

The Enterprise Locus

Figure 6:
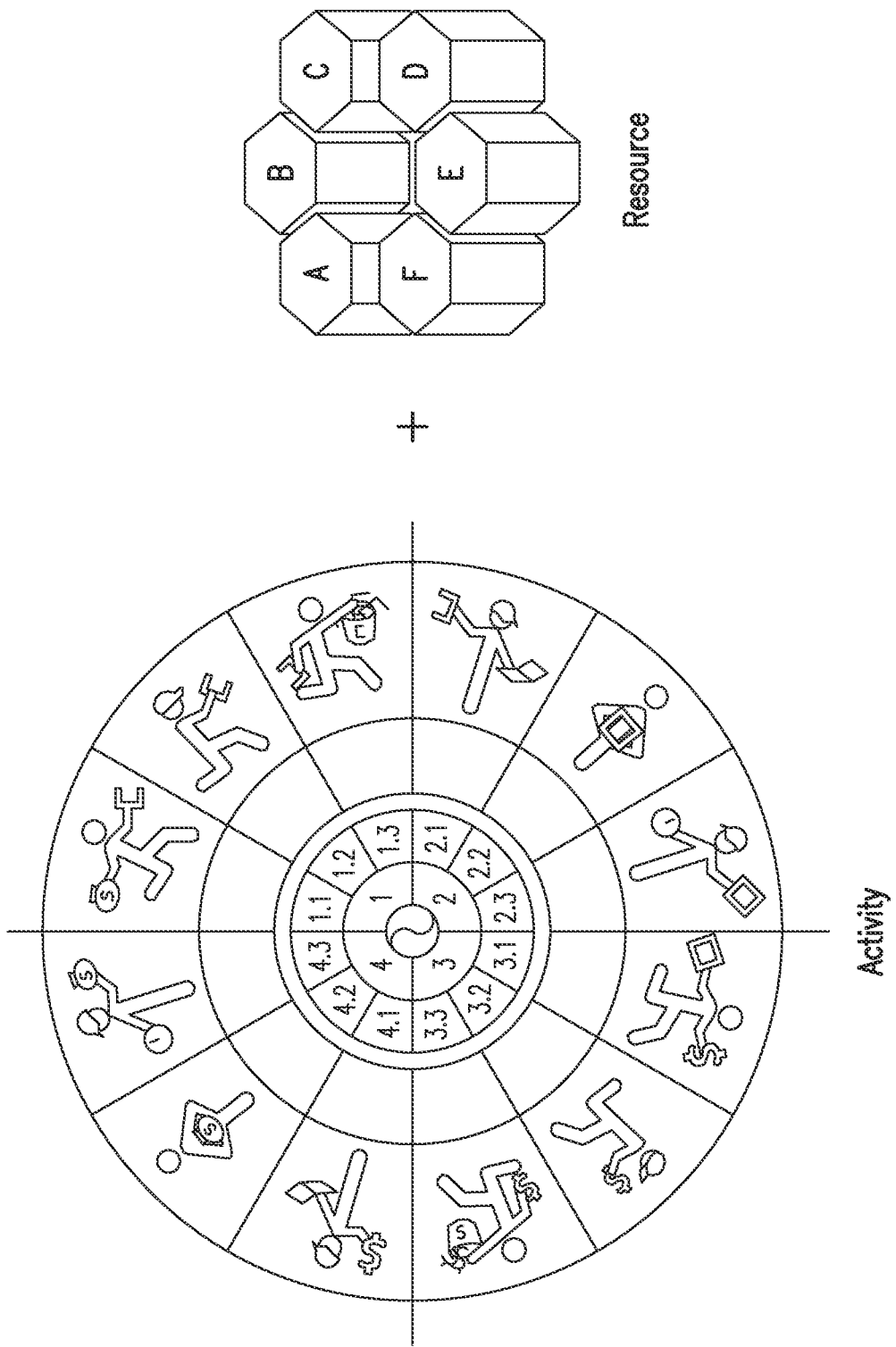
FIG. 6 illustrates example activities and resources.
Figure 7:
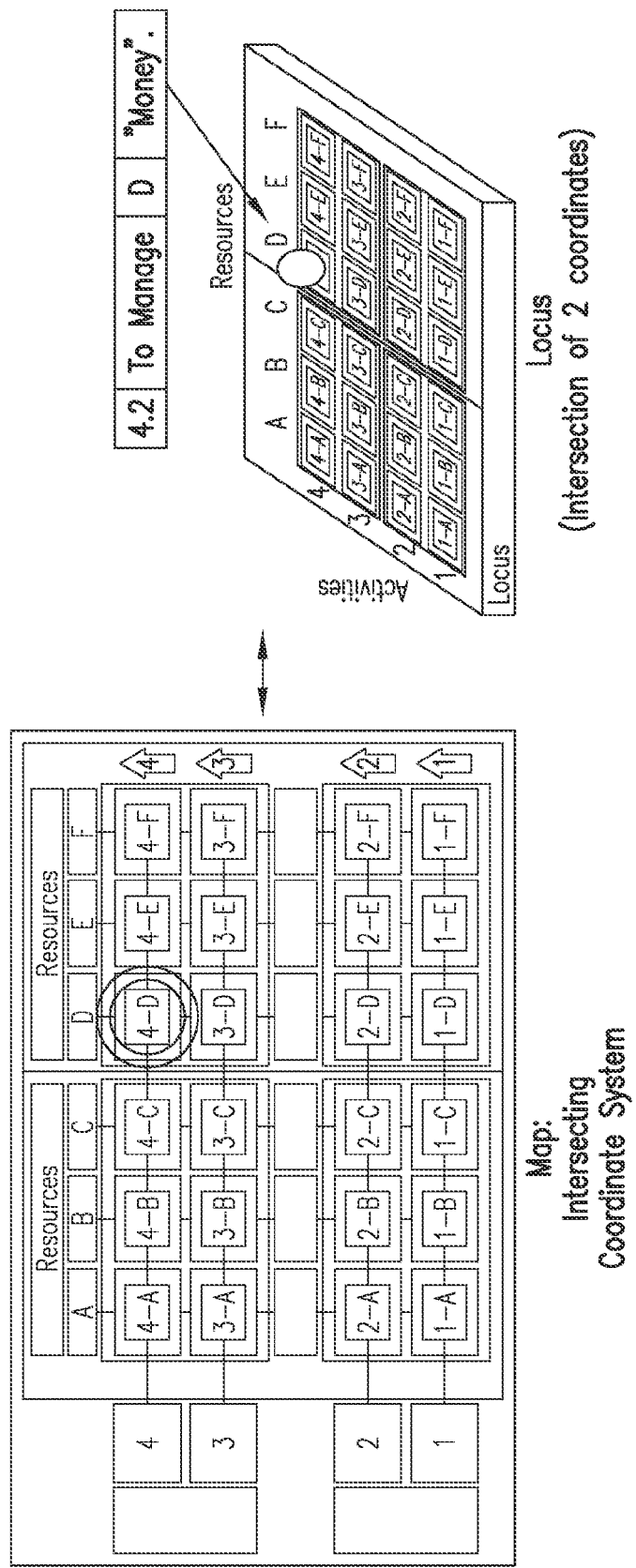
FIG. 7 illustrates example activity phases and resources.
Figure 8:
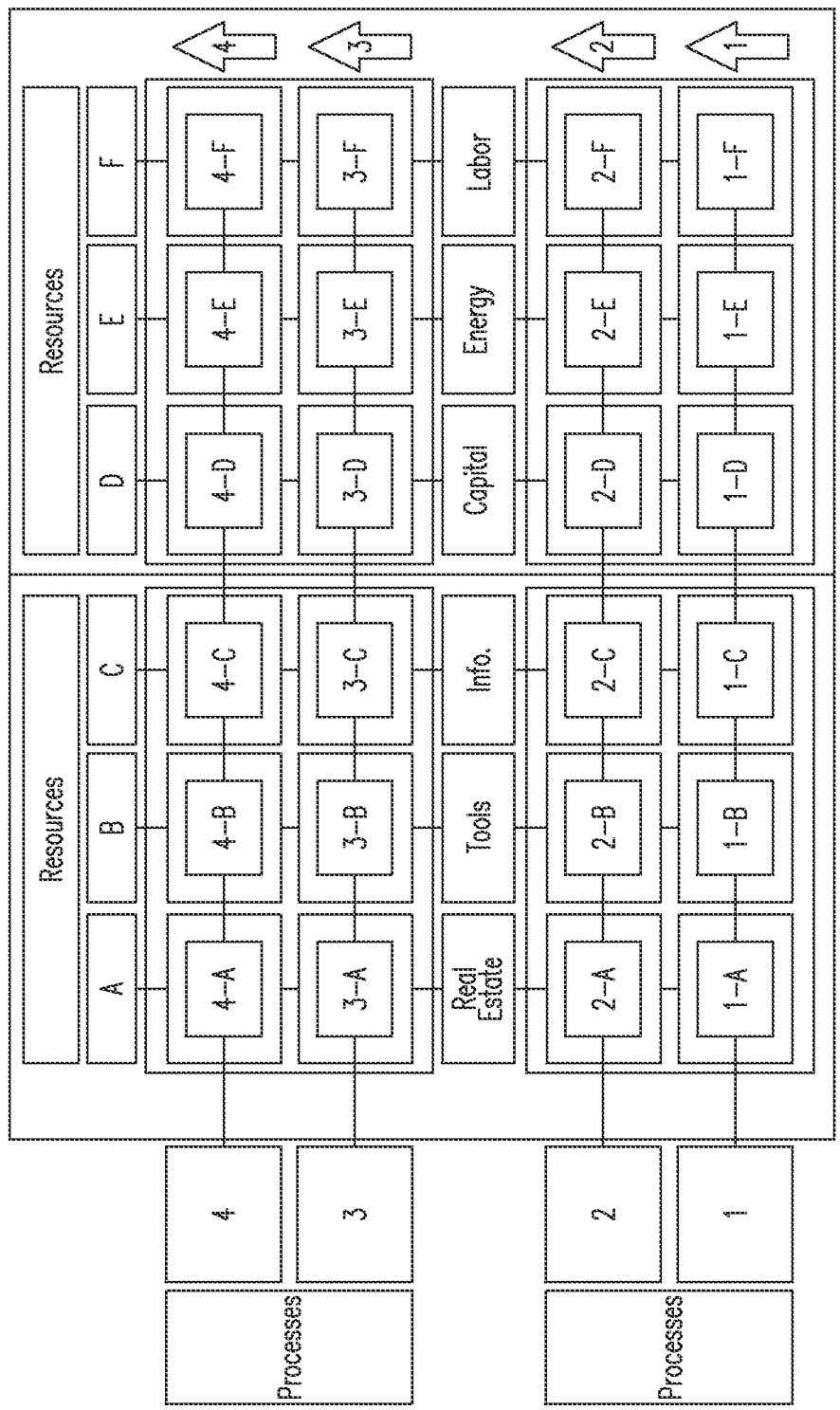
FIG. 8 illustrates example resources and processes.

As illustrated in FIG. 6, a locus can comprise an activity and its object resource. As described above, there can be, for example, six categories of resources. The intersection of an activity with its object forms a coordinate on a grid. An example of such a grid is illustrated in FIG. 7, showing four activity phases operative on six categories of resources.

A company can be classified by the activity in which it produces its product, and the object resource of that activity. More generally, this activity is the job or function which the company performs in the economy.

A categorized company can be associated with an enterprise locus. The enterprise locus of a company can comprise 1) the activity which the company performs, and 2) the object resource of the activity. For example, a company, such as an airline, that transports people could be classified as a "1.2 F". An auto manufacturer could be classified as a "2.2 B" because it is in the production of equipment. This arrangement can be considered to be describing an activity and a direct object.

In some cases, for some companies, the output resulting from the activity performed is information, which is in turn used for another resource. For example, asset managers do not typically directly interact with the money which their clients provide. Instead, asset managers produce the information which governs how this money will be invested. These types of companies can be characterized by indicating that the direct object is information, and the indirect object is the resource for which the information is used. This arrangement can be considered to be describing an activity, a direct object, and an indirect object. For example, an educational institution may be characterized as a "2.1 C-F" because it educates people using information.

According to the model described herein, activities are performed by using resources. As a result, the complete syntax for a locus can be stated as subject resource—activity—direct object—indirect object. Subject resources can be considered to act on object resources. For example, a company involved in electrical parts distribution could be characterized as a "B-3.1-B" while an internet retailer of consumer goods could be characterized as a "C-3.1-Div" (where "div" indicates diversified).

The enterprise locus structure described above of encoding based on an activity, a direct object, and an indirect object, can be used to classify more than the enterprise of a specific company. The same locus structure can be used to classify numerous additional attributes.

The Customer Locus

The customer locus can be used where a company produces or provides a product which is used by the company's customer. For example, an architect may produce a blueprint which is used by companies which develop real estate. The production of the blue print by the enterprise may be encoded as a "2.1 A-C" and the customer may be encoded as a "2.2 A".

Intermediary Locus and Customer of Customer Locus

A company can also be represented by additional loci. For example, in addition to an enterprise locus and a customer locus, a company can be represented by an intermediary locus and a customer of customer locus. The intermediary locus can be used to classify an intermediary that enables the company to provide its product to its customer. The customer of customer locus can be used to classify the customer of the customer. All of the loci used in the system can include some or all of a subject resource (if applicable), activity, direct object resource, and indirect object resource (if the direct object is information).

Product Locus

A product produced by a company can be characterized using the same locus data structures, including some or all of a subject resource (if applicable), activity, direct object resource, and indirect object resource (if applicable). A company can be considered to provide one of three types of products: 1) a resource component, 2) a final resource, or 3) an outsourced activity.

Levels

Figure 11:
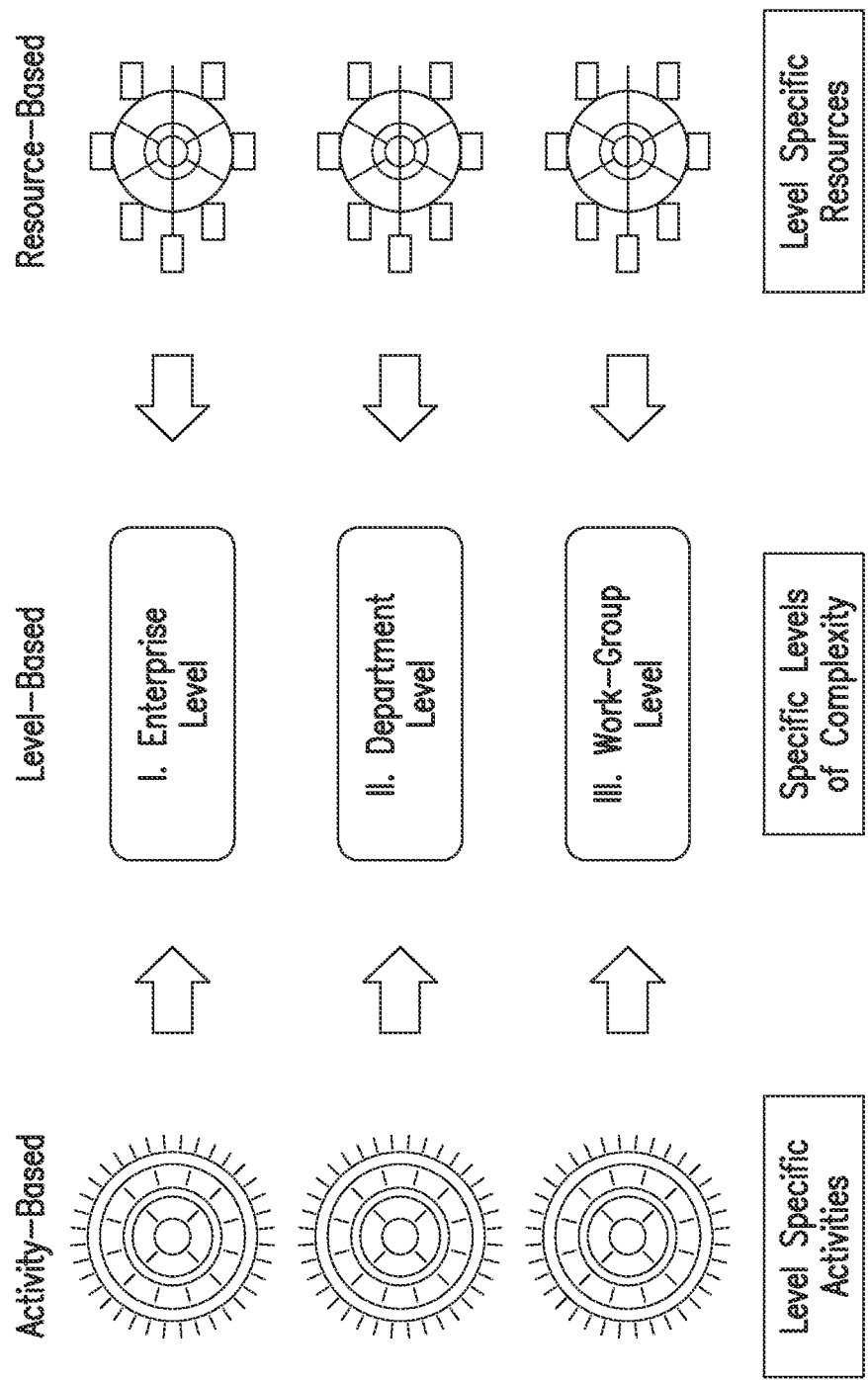
FIG. 11 illustrates an example of organizational levels and relationships between and among levels.

A company can be represented using four levels which define the degree of organization complexity within the operations of the company. The levels can include: company-level, internal activity-level (work groups and departments), final resource level, and subordinate resource level. Because products are not companies, but rather used in the operations of companies (and consumers), products are used at either the subordinate resource, final resource, or internal activity level. FIG. 11 illustrates an example of organizational levels and relationships between and among levels.

Subordinate resources are considered to be stage 1, 2, or 3 resources and are represented by the syntax of: subject resource-activity-object resource. For example, an airplane engine would be encoded as "B3-2.2-E4". Final resources are considered to be level 4 resources and are represented by the syntax of: subject resource-activity-object resource. For example, an airplane would be encoded as "B4 1.2 F".

At the work group and departmental level, companies which do not transfer ownership of a resource from themselves to their customers, but which instead perform one of these activities on their customers' behalf, provide an activity-product. The syntax for encoding activity-products can be the same as for companies: optional subject resource (only required for certain activities, including but not limited to 1.2 or 3.1)-activity-direct object-output object. For example, transportation activity using the airplane could be encoded as "(B4) 1.2 F".

The levels within a company can be hierarchically related and lower-levels resources and activities can be used as part of the operations of higher-level resources and activities. For example: A company may manufacture car engines which are used within a car. The engine produces final energy within the car. The car manufacturer incorporates the engine into a car. The car is used to transport people. People are the customers of the car. They use the car in their transportation activity.

Classification Systems Employed

The parameters discussed above and the information processed by the systems and methods described herein can be represented in various different types of classification systems. Four types of classification systems are presented below:

Anatomic classification systems which classify every element of a system as performing a function which contributes to and can be related to the function of the whole system;

Coordinate classification systems which assign attributes to all the elements of a system in order to determine the relative positions and order of those elements in the system;

Anatomic coordinate classification systems which are anatomic systems which are defined using coordinate values; and Word classification systems which group words based on linguistic categories such as nouns and verbs into expressions and sentences.

Based on these definitions, these classification systems can be applied at the four levels of classification: 1) resources, stages and activities; 2) loci; 3) fields; and 4) the entire company classification system.

In this example, fields and levels are a syntactic flag associated with loci. In general, a syntax flag is a string of tags that represent a valid syntactic position. Syntax flags can be used in connection with macro-tags comprising micro-tags, such as in a bar code. In various embodiments, flags can be associated with an entire syntax and/or components of a syntax.

Anatomic Classification Systems

Anatomic classification systems classify every element of a system as performing a function which contributes to and can be related to the function of the whole system (parts for elements, parts perform functions for each other and for whole, together facilitate object of whole). The function of a system is defined as the process which a system performs in order to transform the inputs to the system into the output of that system. Therefore, the function of a system is defined by that system's internal 2.2.2 activity.

When the anatomic system is itself an element of a higher-level system, and that higher-level system is also an anatomic system, sets of related hierarchical anatomic systems are considered to be nested anatomic systems. For these nested anatomic systems, the functional relationships between the hierarchically related anatomic systems can be defined, from the lowest-level system to the highest-level system.

For example, three types of nested anatomic systems can be used: nested morphological systems, nested physiological systems, and nested classification systems. Each type of nested anatomic system can be defined.

Nested Morphological Systems

Nested morphological systems are anatomic systems which are hierarchically related at multiple levels according to their morphology. A system's morphology is defined as the system's structure. Therefore, when two systems are hierarchically related according to their morphology, the structure of one system is a constituent part of the larger structure of the other system. It therefore follows that the function which the lower-level system performs is also one of the functions which the higher-level system performs. Therefore, the two systems are anatomically related. For example, the information processing function of a semiconductor contributes to the information processing function of a computer.

The classification system described herein defines the structure of a system by its subject resource (which may represent a set of subject resources). Therefore, when two or more systems are morphologically related, the subject resource of one system is a constituent part of the subject resource or set of subject resources of the other system. Accordingly, nested morphological systems can be classified as different operating levels: subordinate resource level, final resource level, work group level, departmental level, and company and consumer level.

Nested Physiological Systems

Nested physiological systems are anatomic systems which are hierarchically related at multiple levels according to their physiology. A system's physiology is defined as the processes or activities which the system performs. Therefore, when two systems are hierarchically related according to their physiology, the processes of one system are a constituent part of the larger-scale processes performed by the second system.

The function of a system can be defined as the process whereby the system converts inputs into outputs; and that therefore the function of a system is defined by that system's internal 2.2.2 activity. When two systems are physiologically related, the process which a lower-level system performs (its internal 2.2.2 activity) is a component part of the process which the higher-level system performs (the internal 2.2.2 activity of the higher-level system). Therefore, by definition, the function of the lower-level system is a component part of the function of the higher-level system; and the two systems are thus anatomically related. For example, a 4.2.1 consulting function contributes to the 4.2.2 management function of a company.

While different operating levels have physiological relationships (in addition to their morphological ones), physiological relationships can be classified as relating to the processes performed by departments, divisions, phases, and cycles. Departments perform processes which are constituent parts of divisions, divisions perform processes which are constituent parts of phases, and phases perform processes which are constituent parts of cycles.

The physiological relationships between departments, divisions, phases and cycles are expressed by the outputs and objects of these systems. In other words, the output (object) of a department reflects its own output, as well as the output of its division, phase and cycle. Therefore, nested physiological systems can be classified by identifying multiple objects (direct and indirect) for a given locus. In this case, the indirect object of the department classified by the locus reflects the direct object of that department's phase. That phase is physiologically related to the department classified.

Nested Classification Systems

The system can include four levels of anatomically-related classification systems: elements (resources, stages, and activities), loci, fields, and company classification system (in its entirety). The function of each classification system is to classify some attribute relating to the company being classified. This function contributes to and can be related to the function of a higher-level classification system—namely the classification of a larger-scale set of attributes relating to the company. Therefore, the system described herein can include a series of nested anatomic systems, in which the classification systems at every level perform a classification function which contributes to the classification function of a classification system at a higher-level. Therefore, all four levels of classification systems are anatomic systems.

Classifying Morphological and Physiological Systems

Morphologically and physiologically related systems can be classified within a tiered structure as follows:

At level 1—the elements classification level, when resource stages are classified;

At level 3—the fields classification level, when loci are classified into fields by relating the loci in those fields based on their operating (morphological) level;

Physiologically related systems are classified at the following levels of classification:

At level 2—the loci level, when the direct and indirect objects of a locus are classified. The direct object of a locus refers to the object of the department. The indirect object of a locus refers to the object of that department's phase.

Coordinate System

A coordinate system assigns attributes to the elements of a system in order to determine the relative positions and order of those elements in the system. The coordinate systems described herein can share the following characteristics:

1. A common denominator according to which increments between the elements of the system can be measured, compared, and differentiated. The denominators of time, level, importance, or mechanical role can be used. All coordinate systems have a common denominator according to which increments between the elements of the system can be measured, compared, and differentiated. As described herein, four types of denominators are used for coordinate-based systems:

Time (also known as "sequence" or "sequential"): classifying actions in the activity cycle, classifying loci into fields, classifying fields into the whole company classification system;

Morphological Level: classifying resource stages, classifying loci into fields;

Importance: classifying loci into fields;

Mechanical Role (also known as functional role): classifying resources into resource categories.

2. A fixed reference point for the elements of the system. This fixed reference point can be either a) an element of the system, b) a higher-level classification system of which that system is a part, or c) an element external to that system. All coordinate systems have a fixed reference point for the elements of the system. Tree types of fixed reference points can be identified:

a) When the elements of a system are anatomically related based on their morphology or physiology, the elements of that system are classified with reference to the highest-level morphological or physiological element of the system.

Resource Stages: the 12 resource stages with which resources are classified are anatomically related based on their morphology. Therefore, the resource stage coordinate values have a fixed reference point of their highest-level coordinate value: stage 4.

Loci related by morphological levels: Loci defining a subordinate resource, final resource, work group, department, and company are anatomically related based on their morphology. Therefore, level coordinate values have a fixed reference point of their highest-level coordinate value: the locus classifying the company or consumer in whose operations the other loci function.

Activity Cycle: the 2.2.2 activity of the internal activity cycle of any system is at the same time that activity which the system as a whole performs in order to produce its product. In other words, this 2.2.2 activity, in addition to being a part of an activity cycle, also operates at a higher level than the other activities of that cycle. Therefore, the non-2.2.2 activities of an activity cycle are classified with reference to the 2.2.2 activity of that cycle.

b) When the elements of a system are not anatomically related based on morphology or physiology, the same coordinate values which are used for the system elements to an anatomic system which contains those elements can be applied, then the elements of that system with reference to that superior anatomic system classified.

Resources: No one final resource is at a higher level than another final resource. However, the mechanical role of the work group in which those final resources are used can be classified. Resources with reference to the contribution which the final resources of their respective categories (A, B, C, D, E, F) make to the function and operation of their work group can be classified, which is the anatomically superior system (by morphology) in which those resources are used.

Loci related by importance: When two loci are related by their relative importance to the field in which they operate, neither locus operates at a higher morphological or physiological level than the other locus. However, which locus is more important can be defined with reference to the field in which they operate. The relative importance of these loci can be classified with reference to the contribution which they make to the field in which they operate. This field is an anatomically superior system (by classification) in which these loci are classified.

c) When the elements of a system are not anatomically related based on morphology or physiology, and it is not possible to define the coordinate values of those elements in relation to similar coordinate values of a superior system, then the elements of that system can be classified with reference to an element which is external to that system (not in that system).

Temporal relationships between loci: When two loci are temporally related, neither locus operates at a higher morphological or physiological level than the other locus.

The temporal relationship between these two loci can be classified with reference to an element which is not classified by either locus but which is instead acted on or influenced by the activities specified in both loci.

When the two enterprise loci, the two intermediary loci, or the two customer loci are temporally related, they are so related with respect to when the activities specified in both loci interact with the company's product.

Temporal relationships between fields: Similarly to temporal relationships between loci, fields are defined with reference to their temporal interaction with the company's product. There is also a functional relationship.

3. A directional reference which defines the order of values according to the common denominator. A directional reference which defines the order of values according to the common denominator.

Time: When the relationship between elements of a system is based on time, then the temporal order of these elements (first, second, third) can be defined with respect to some fixed reference point.

Morphological Level: When the relationship between elements of a system is based on morphological level, the hierarchical order of these elements can be defined from lowest-level (least complex) to highest-level (most complex). Lower-level elements always perform a function to enable the function and operation of the higher-level elements.

Importance: When the relationship between elements of a system is based on importance, then which element is the most important (primary), which element is the next most important (secondary), etc. can be defined.

Mechanical Role: Resources are first classified as either operational or enabling resources according to their function, and are then classified in the order of 1) foundational, 2) mechanical, and 3) neural.

Anatomic Coordinate System

An anatomic coordinate system is an anatomic system which is defined using coordinate values. As a result, every element in the system performs a function which contributes to and can be related with the function of the system as a whole. Each element in the system has values associated with it which define the position and order of each element in the system.

Because classification systems at each of the four levels are anatomic, the classification of elements, fields, and the whole company classification system—since they are coordinate-based—are by definition anatomic coordinate systems:

Elements: resources, stages, and activities—anatomic coordinate classification systems Loci: anatomic word classification systems which are not coordinate-based Fields: anatomic coordinate classification systems Word Classification System A word classification system groups words based on linguistic categories such as nouns and verbs into expressions and sentences. The elements of the system—the nouns, verbs, adjectives and adverbs—have functional meanings and values associated with their grammatical position in the expression or sentence. As described herein, level 2(loci) is an anatomic word classification system, because the classification system applies grammatical values to the elements of the system—resources and activities—in order to order them into a locus, or sentence.

Defining the Levels of Classification

An overview of classification levels is provided below.

A customer locus will have four coordinate values which uniquely determine its syntactic position:

Level: Company-level
Importance: Primary (or secondary)
Time: Second (or first)
Field: Customer Field Similarly, an enterprise locus will have four coordinate values:

Level: Company-level
Importance: Secondary (or primary)
Time: First (or second)
Field: Enterprise Field A product locus will have only 2 coordinate values, because there is only 1 locus operating at that level:

Level: Subordinate Resource Level (or final resource, work group, or departmental level)
Field: Customer Field The levels are defined with respect to how anatomic coordinates are used to classify loci into fields.

The classification system is a nested anatomic classification system consisting of four levels. How to apply the different types of classification systems at each of these four levels is described below. The four levels of classification are:

1. Elements: Resources, Stages, and Activities. These elements can be classified by using an anatomic coordinate system based on the common denominators of mechanical roles, levels, and time, respectively.
2. Loci: Elements can be classified into loci using a word classification system by defining the grammatical roles of elements within those loci.
3. Fields: Loci can be classified into fields by using an anatomic coordinate system based on the common denominators of time, importance, and level. These anatomic coordinates are expressed both by the values and sections of the loci within their field, and by the relationship markers assigned to those loci. Fields define the largest groupings of loci which can be defined and ordered by these three types of coordinate values.
4. Company Classification System: Fields can be classified into the whole classification system by using an anatomic coordinate system based on time.

Based on these definitions, it is possible define for each of the four fields how to organize loci by using the anatomic coordinates of time, importance, and level. In doing so, it is possible to define relationship markers as expressing these coordinate values.

Classification Level 1: Resources

The first level of classification is the classification of resources, resource stages, and activities. The resource classification system classifies all resources used in the economy with six resource coordinate values. The resource system can be represented as an anatomic system, because each element of the system performs a function which contributes to and can be related to the function of the whole system.

Elements: The elements of a resource system are the resources used as the subjects of a work group. These resources are classified with six resource coordinate values. Each resource coordinate value is defined as performing a specific type of function for the whole resource system.

Whole System: The whole resource system consists of all subject resources used in a work group and can include at least one resource in each of the six coordinate values.

Functions can be related: The resource system can be represented as an anatomic system because the functions of each of the elements—as defined by the 6 coordinate values—contributes to and is related with the function performed by the full set of subject resources, which is to perform the work of that work group.

The resource system can be represented as a coordinate system because each resource used in a work group is assigned one of six attributes which determines the relative position and order of those resources within the work group: A (real estate), B (equipment), C (information), D (money), E (energy), and F (labor).

The common denominator for resource coordinate values is mechanical role. Each of these six coordinate values is associated with a specific type of function which a resource classified with that coordinate value provides to the work group in which it operates. These six mechanical roles are: A) passive structure; B) physical work; C) directives; D) financing; E) power; and F) initiation of all physical and information-based work. Note that in addition to functional role, A) and B) are also differentiated by whether they are fixed-in-place or moveable.

Resource coordinate values can have a fixed reference point in the work group. Resources are classified with reference to the contribution which the final resources associated with each of the 6 resource coordinate values make to the function and operation of their work group.

In some embodiments, the directional reference of resource coordinate values can be 1) structural, 2) mechanical, and/or 3) neural. In other words, based on the common denominator of mechanical role the structure and environment necessary to perform the action of a work group proceeds the physical force of the action, which proceeds the ongoing monitoring and control of that action.

Resource Stage Classification System: The resource stage classification system classifies all resources (with the exception of F) used in the economy with 12 resource stage coordinate values. The Resource Stage Classification System is an anatomic system, because each element of the system performs a function which contributes to and can be related to the function of the whole system.

Elements: The elements of a resource stage classification system are the stage values used to define the morphological level of the resource which are classified. By definition, a resource classified with a given stage value is a component part of a resource with a higher-level stage value and performs a function which is one of the many functions performed by the higher-level resource.

Whole System: The whole system consists of all resource stages which collectively compose a final resource. The whole system can include at least one level-1 stage value and one level-4 stage value, and may include up to all twelve resource stage values.

Functions can be related: The resource stage system is an anatomic system because the function performed by a resource with a lower-level stage value contributes to and is related with the function performed by a resource with a higher-level stage value, and ultimately with the final resource itself.

The resource stage system can be represented as a coordinate system because all resources are assigned 1 of 12 attributes which determines the morphological level of a given resource within a final resource. The common denominator for resource stage coordinate values is morphological level. Each of the 12 coordinate values is associated with a specific morphological level relative to a final resource. Resource stage coordinate values have a fixed reference point in the final resource. Resources can be classified with stage values which define the morphological level of that resource relative to the final resource in which it operates.

The directional reference of resource stage coordinate values is "up" or "down". In other words, when moving from a resource with a lower-level stage value to a higher-level stage value, one moves "up" in terms of morphological level, and vice versa one moves "down" when one moves from a resource with a higher-level stage value to a resource with a lower-level stage value.

Classification Level 1: Activities

Activity Classification System: The activity classification system classifies all actions performed in the economy with 36 activity coordinate values. The Activity Classification System is an anatomic system, because each element of the system performs a function which contributes to and can be related to the function of the whole system.

Elements: The elements of an activity classification system are the 36 activity values which every company and person can perform. If an economic system does not have a full internal activity cycle (for example, work groups and resources), then the activity system of that economic system is defined as consisting of all internal activities performed by that economic system. In other words, an activity system may not contain all 36 coordinate values.

Whole System: The whole activity system consists of all 36 activities and defines the function which all 36 activities collectively perform. This function is defined by the 2.2.2 activity of the system. Companies and people have a whole activity system.

Functions can be related: The activity classification system is anatomical, because the functions of all elements classified with the 36 activity coordinate values is to enable the functionality of the activity cycle as a whole—in other words, the 2.2.2 activity which at the same time represents the process of the whole activity system.

The activity system can be represented as a coordinate system in that actions are assigned 1 of 36 attributes which determines the temporal relationship and functional role of a given action within its activity system (activity cycle). The common denominator for activity coordinate values is time. Each of the 36 coordinate values is associated with a specific temporal position relative to the other actions of the cycle.

Activity coordinate values have a fixed reference point in that the 2.2.2 activity of that system. Actions with activity values which define the temporal relationship of that action can be defined relative to the 2.2.2 activity of the system, because the 2.2.2 activity defines the process which the higher-level system performs in order to produce its output.

In some embodiments, the directional reference of activity values can be forward. In other words, the activity coordinate values are temporally ordered such that a given action temporally proceeds another action with a higher activity coordinate value. Time can be sequentially ordered.

Classification Level 2: Loci

The second level of classification is the classification of resources and activities into loci. The classification system can be an anatomic system, because each element of the system performs a function which contributes to and can be related to the function of the whole system.

Elements: The elements of a locus classification system are resources (and their stages) and activities.

Whole System: The classification system can include a subject resource (optional), activity, direct object, and indirect object (optional). In this system, each resource and activity element performs a functional role. Functions can be related and the classification system can be anatomical because each element (resource and activity) has a defined grammatical role which contributes to the function defined by the locus as a whole.

A word classification system groups words based on linguistic categories such as nouns and verbs into expressions and sentences. Therefore, the classification of resources and activities into a locus is a word classification system, because resources and activities are defined as nouns and verbs, respectively, and assign these nouns and verbs values dependent on their grammatical position within the locus.

A locus has four grammatical positions: Subject Resource (optional)-Activity-Direct Object-Indirect Object (optional). By assigning one of these four positions within the locus to a resource or activity, the function of that resource or activity is defined relative to the other resources and activities in the locus, and to the locus itself.

Classification Level 3: Fields

The third level of classification is the classification of loci into fields. A field is defined as a system of loci in which the positions and identity of the loci within that field are uniquely determined by these three types of coordinate values. The field classification system classifies loci into fields by using three types of coordinate values:

Level: defines the morphological level at which a locus operates;

Time: defines when a locus operates relative to a fixed reference point;

Importance: defines the relative importance of a locus based on its contribution to the function of the field in which it is classified.

A field is defined as a system of loci in which the positions and identity of the loci within that field are uniquely determined by these three types of coordinate values. The size of a field can be determined by defining it as consisting of all loci which can be related to each other with these three types of coordinate values. Therefore, for a given field, all the loci in a given field can be related to each other by using these three types of coordinate values: morphological level, time and importance.

Using these criteria, four fields of loci can be identified:

Enterprise Field: defines the operations of the company classified.

Intermediary Field: defines the operations of the intermediaries of the company classified.

Customer Field: defines the operations of the customer or customers which use the company's product, and the function and use of the product within the operations of the most important customer.

Customer of Customer Field: defines the operations of the customer of customer which uses the customer's product, and the function and use of the customer's product within the operations of the customer of customer.

Three types of coordinate values can be used to order loci into fields are defined in more detail. These four fields can be defined in more detail and both 1) the names and order of the loci and 2) relationship markers can be used to define the 3 types of coordinate values for each field.

Within a field, the horizontal axis is based on the coordinate values of time and importance and the vertical axis is based on morphological levels. The position and identity of the two enterprise loci within the Enterprise Field is entirely determined by:

Importance: the enterprise locus which contributes more to the function of the Enterprise Field is labeled "primary" and the other locus "secondary";

Time: with reference to the company's product, the enterprise locus which operates first is labeled "first" and the other locus "second";

Level: both enterprise loci operate at the company level. This coordinate value therefore provides important information but does not differentiate them.

Therefore, each enterprise locus can be provided three coordinate values of importance, time, and level, which uniquely identify the two loci within the field.

The position and identity of the two intermediary loci within the Intermediary Field is determined by:

Importance: the intermediary locus which contributes more to the function of the Intermediary Field is labeled "primary" and the other locus "secondary";

Time: with reference to the company's product, the intermediary locus which operates first is labeled "first" and the other locus "second";

Level: both intermediary loci operate at the company level. This coordinate value therefore provides important information but does not differentiate them.

Therefore, each intermediary locus can be provided three coordinate values of importance, time, and level, which uniquely identify the two loci within the field.

With respect to the customer field, the horizontal axis can be based on the coordinate values of time and importance and the vertical axis is based on morphological levels. The positions and identities of the six loci within the customer field can be determined by the three coordinate values of:

Level: at which of the 5 morphological levels does the locus operate;

Importance: when there is more than 1 locus at a particular level, which locus is more important. This applies to the company level, where two customer loci are identified. Importance can be "Primary" or "Secondary."

Time: when there is more than 1 locus at a particular level, which locus is performed first with reference to some fixed reference point. This applies to the company level, where two customer loci are identified. The reference point can be the company's product. Time can be "First" or "Second."

With respect to the customer of customer field, the horizontal axis can be based on the coordinate values of time and importance and the vertical axis is based on morphological levels. The positions and identities of the six loci within the customer field are entirely determined by level coordinate values:

Level: at which of the five morphological levels does the locus operate.

Importance: because there is only one locus at a given level, n/a.

Time: because there is only one locus at a given level, n/a.

Classification Level 3: Levels

"Level" Coordinate Values: define the morphological level at which each locus in a given field operates. Five morphological levels can be identified, in ascending order: Subordinate Resource Level, Final Resource Level, Work Group Level, Departmental Level, Company and Consumer Level.

The Level Classification System is anatomic, because each element of the system performs a function which contributes to and can be related to the function of the whole system.

The elements are the loci classified at the different morphological levels. The system is the highest-level locus in which operations the lower-level loci are classified, and all the loci identified as operating in that highest-level locus. A lower-level locus performs a function which contributes to and is related with the functions performed by the higher-level loci in whose operations that locus operates.

Level-based Coordinate Values

Because every locus can be specified as operating at one of these five levels, level coordinate values can be applied to every locus in every field. However, because the "Level" Classification System is coordinate-based, three characteristics can be defined:

A Common Denominator according to which increments between the elements of the system can be measured, compared, and differentiated. The denominator here is the level at which the locus operates. A locus can be classified according to this denominator by defining the locus as operating at one of the five levels listed.

A Fixed Reference Point for the elements of the system. The fixed reference point here is the higher-level classification system of which that system is a part. Note that simply classifying a locus at one of the five levels does not necessarily define this fixed reference point.

A Directional Reference which defines the order of values according to the common denominator. This directional reference is defined by ordering these five levels from lowest to highest.

By labeling each locus with one of the five level values, 1) the common denominator and 3) the directional reference can be defined, but 2) a fixed reference point is not necessarily defined.

Defining the Fixed Reference Point

The fixed reference point for a level-based classification system is the highest-level locus (company, consumer) in which a locus operates. In other words, even though multiple fields may contain loci which have the same level coordinate value (subordinate resource, final resource . . . ), the loci in different fields will have different fixed reference points, because the company or consumer in whose operations the locus operates will be different.

For example, a departmental locus can be classified in both the customer's operations and the customer of customer's operations. These 2 loci have the same level-based coordinate value—the department—but they have different reference points: the customer and the customer of customer, respectively.

In some embodiments of the classification system, seven loci can be identified which classify companies or consumers:

2 Enterprise Loci
2 Intermediary Loci
2 Customer Loci
1 Customer of Customer Locus These 7 loci are therefore the fixed reference points for the levels-based coordinate system. In some cases, no more than 1 departmental, work group, final resource, or subordinate resource locus within the operations of any of these 7 loci are identified. Therefore, in that classification system, simply stating the highest-level locus as the reference point is sufficient to uniquely map every locus. Note that for these 7 loci, they are their own reference points, in addition to having a company or consumer level as their coordinate value. In addition, 1 fixed reference point may be sufficient for when jobs are added (which would be a final resource within an enterprise locus).

Theoretical Application of Level-based Coordinates

In some cases it is possible to identify two or more loci at the same morphological level within the same company's or consumer's operations. In this case, it would be necessary not only to specify the highest-level company or consumer as the reference point, it would also be necessary to specify an immediate higher-level locus as a reference point to distinguish the two loci.

For example, if two final resources within 1 company's operations are classified, then the two final resources may be used within different work groups, in which case by referencing the different work groups the levels-based coordinate values of these 2 loci could be differentiated. Note that if the two final resources were used in the same work group, then they would operate as part of the same work group set of subject resources and would then have the same levels-based coordinate values.

Classification Level 3: Time

Temporal Coordinate Values define the temporal relationship between 2 or more loci operating at the same level in the same field. The coordinate values of: First, Second, Third, etc. could be used.

The Temporal Classification System is anatomic, because each element of the system performs a function which contributes to and can be related to the function of the whole system. The elements are the loci classified with the different temporal coordinate values. The whole system includes all the loci which are temporally related to the same fixed reference point. In order for the locus with the "Second" temporal coordinate to perform its function, the locus with the "First" temporal coordinate can perform its function, and similarly for loci labeled "Third," "Fourth," etc. In other words, the functions of each of the loci has a defined temporal relationship with the function of each of the other loci with the same temporal reference point. Therefore, the functions of each locus to each other can be related, and ultimately to the functions represented by all of the loci temporally related which compose this temporal classification system.

Temporal Coordinate values. When more than 1 locus is classified as operating at the same morphological level within a given field, those loci can be differentiated by applying temporal (and also importance-based) coordinate values. Using only multiple loci at the level of companies and consumers, temporal coordinate values can be applied to this company-level. Therefore, temporal coordinate values can be used to relate:

The two Enterprise Loci as First and Second
The two Intermediary Loci as First and Second
The two Customer Loci as First and Second Because the classification of loci into systems of temporally related loci is coordinate-based, 3 coordinate-based characteristics can be defined: The Common Denominator is time. The Directional Reference is forward, as time moves from the locus labeled "first" to the locus labeled "second". The Fixed Reference Point is an element external to the system of temporally-related loci. In other words, this reference point is not one of the related loci or the system consisting of those loci. This fixed reference point can be defined as the company's product. Therefore, the 2 enterprise loci, 2 intermediary loci, and 2 customer loci can be temporally related by defining when the 2 loci of each field interact with the company's product. The way in which these loci interact with the product is determined by the field in which the loci operate. The nature of these interactions for each field can be defined.

Enterprise Loci

If both enterprise loci acts on the same resource-product of the company, then given a resource-product, that enterprise locus which first acts on that product will be classified with the temporal coordinate of "First", and that enterprise locus which acts second on that product will be classified with the temporal coordinate of "Second". If one enterprise locus has a resource-product, and one enterprise locus has an activity-product; or if both enterprise loci have an activity-product, then the company offers the two products created by the 2 enterprise loci in conjunction with one another.

In this case, the temporal coordinates of the 2 enterprise loci ban be based on when the primary customer uses their products. For a given combination of the 2 products, that enterprise locus which produces the product which the primary customer first uses is classified as the first enterprise locus, and that enterprise locus which produces the product which the primary customer uses last is classified as the second enterprise locus.

Therefore, in both cases, the enterprise loci can be classified with reference to the fixed reference point of the product. However, the difference is in the relationship of the enterprise loci to the product: in the first case, when the enterprise loci act on the same product; in the latter case, when the primary customer uses the combination products.

Intermediary Loci

The 2 intermediary loci can be classified with temporal coordinates based on when they first interact with the company's product. If an intermediary takes ownership of a product, then the time when it first takes ownership of the product can be defined to be when it first interacts with that product. If an intermediary does not take ownership of a product, then the time when it first acts on that product can be defined to be when it first interacts with that product. Therefore, for a given company's product, that intermediary which first takes ownership of or acts on the company's product is classified in the first intermediary locus; and that intermediary which next takes ownership of or acts on that same product is classified in the second intermediary locus.

Customer Loci

In some cases, there may be only two customer loci when two customers interact with the company's product (parallel customers). When the company is an intermediary, the company which sells the product being intermediated naturally is classified as the first customer; whereas the company or consumer which buys the product is classified as the second customer.

Note that this is not synonymous with "importance". For example, for a broker which represents the buyer, the first customer is the seller and the second customer is the buyer. However, by order of importance, the primary customer is the buyer and the secondary customer is the seller. When the company is not an intermediary, then broadly speaking the first customer pays for the product, and the second customer uses the product.

Theoretical Application of Temporal Coordinates

The system can be used to differentiate loci using temporal coordinates at the level of companies and consumers. When temporal relationship between 2 loci in a field can be specified by referencing a fixed element, then temporal coordinates can be defined for those 2 (or more) loci. These loci do not have to operate at the same level.

A temporal relationship can be defined between the work group locus and the departmental locus by referencing the A4ii building. When the temporal relationship between the work group and the department is defined as when the loci interact with the building, either by acting on it or using it in the operations of the locus, then the work group can be defined as temporally coming before the department. In other words, the work group can be defined as "first" or temporally proceeding the departmental locus, the "second" locus.

In this expanded application of temporal coordinates, multiple loci do not need to be related at the same morphological level, rather loci at different morphological levels can be temporally related. In this expanded application, a given locus may have more than 1 temporal relationship: not only at its same morphological level, but to a locus which is superior or subordinate to it by level. In other words, loci which are related to each other based on their morphological level may temporally come before or after each other. They may also operate at the same time, which is the usual case for product loci.

Loci operating at different levels would operate at different times primarily when the work group locus and departmental locus are different (when the work group acts on a subject resource used in the department). In some embodiments, this application of temporal coordinates may obviate the need to add an additional morphological level.

Classification Level 3: Importance

Importance-based coordinate values define the relative importance of 2 or more loci operating at the same level within a given field. The coordinate values are labeled as: Primary, Secondary, Tertiary, etc.

The Temporal Classification System is anatomic, because each element of the system performs a function which contributes to and can be related to the function of the whole system. The elements are the loci classified with the different importance-based coordinate values of "primary", "secondary" . . . . The whole system includes the loci which are related based on their relative importance, in some cases, all loci at a given morphological level within a field. Importance-based coordinate values define the relative contribution of the functions performed by the loci at a given level to the overall functionality performed by that entire morphological level in the field. The importance-based classification system is therefore an anatomic system, because the functions performed by the elements—the loci—can be related to the function performed by the whole system—all the loci operating at that same morphological level in the field.

As a non-limiting example, the primary enterprise locus and the secondary enterprise locus are the 2 elements of the classification system consisting of both loci. The primary enterprise locus performs more of the functionality associated with the enterprise loci than does the secondary enterprise locus.

As a non-limiting example, the primary intermediary locus and the secondary intermediary locus are the 2 elements of the classification system consisting of both loci. The primary intermediary locus performs more of the functionality associated with the intermediary loci than does the secondary intermediary locus.

As a non-limiting example, the primary customer locus and the secondary customer locus are the 2 elements of the classification system consisting of both loci. Note that this classification system does not include the whole customer field, but only those 2 loci which operate at the same morphological level—the company-level—and which can be related in terms of their relative importance. The primary customer locus performs more of the functionality associated with the company-level of the customer field than does the secondary customer locus.

Coordinate Values

Because the "Importance-based" Classification System is coordinate-based, the system has the following 3 characteristics:

A Common Denominator according to which increments between the elements of the system can be measured, compared, and differentiated. The denominator here is importance.

A Fixed Reference Point for the elements of the system. The fixed reference point here is the higher-level classification system of which that system is a part: the entire morphological level in a specific field consisting of all the loci related by relative importance.

A Directional Reference which defines the order of values according to the common denominator. This directional reference is defined by our ordering the relative importance of these loci into primary, secondary, and possibly tertiary values.

Classification Level 4: Whole Company Classification System

Anatomic Classification System

The 4 fields—enterprise field, intermediary field, customer field, and customer of customer field—can be classified within the whole company classification system. The classification of the 4 fields—Enterprise Field, Intermediary Field, Customer Field, and Customer of Customer Field—into the whole company classification system is an anatomic classification system: The elements of the classification system are the 4 fields and the whole system consists of all 4 fields.

The function of the whole company classification system is to classify the company within the economy by defining a series of standardized attributes relating to that company. The function of 1 field is to classify a series of attributes relating to one aspect of a company's business, and these attributes contribute to and constitute a component part of the classification system as a whole. Therefore, the relationship of these 4 fields to the whole company classification system is anatomic.

Temporal Coordinate Classification System

The 4 fields are temporally related, so that:

The Enterprise Field first interacts with the company's product by making or providing that product. Therefore, with reference to a given company product, every enterprise locus temporally comes before every other locus in the other field.

The Intermediary Field next interacts with the company's product either by purchasing and reselling the product or acting on it to enable it to be sold. Therefore, with reference to a given company product, every intermediary locus temporally comes after every enterprise locus and before every locus in the customer and customer of customer fields.

The Customer Field interacts with the company's product by purchasing it and using it in the customer's operations. Therefore, with reference to a given company product, every locus in the customer field temporally comes after every intermediary locus and before every locus in the customer of customer field.

The Customer of Customer Field interacts with the company's product by using the customer's product, which was a result of the original company's product being used in the customer's operations. Therefore, with reference to a given company product, every locus in the customer of customer field temporally comes after every other locus in the other 3 fields.

However, even though these four fields are temporally related, this temporal relationship is not coordinate-based. If a company is classified with at least one locus in each of the four fields, then the fields would be temporally ordered:

Enterprise Field: First, Intermediary Field: Second, Customer Field: Third, Customer of Customer Field: Fourth. However, a company is classified with no Intermediary Field and no Customer of Customer Field, then the fields would be ordered:

Enterprise Field: First, Customer Field: Second.

Therefore, fields do not have defined temporal coordinate values.

A locus can be defined as having a unique position in a field based on the 3 coordinate values of time, importance, and level.

The field value of a locus to uniquely determine its position in the whole classification system, the only option is to assign each locus a 4th coordinate value specifying in which of the 4 fields the locus operates: Enterprise Field, Intermediary Field, Customer Field, Customer of Customer Field.

Differentiating Business Information

Information can be used as a marker for each unique activity performed by a business. Labor could be differentiated and located in their appropriate place in the system.

Generalizable Model of an Eco-System

An economic system is a systems of cooperative activities (and their structural elements) among members of a species that provide for and maintain the elements used by the specific species to live their lives. In some cases, economic systems can be considered to be sub-systems of an ecological system, operating under the same functional rules and environmental constraints as each sub-system that provides for and maintains the macro-ecological system in which they all exist and operate.

Labor Systems

The systems of cyclical activities (and their structural elements) that provide for and maintain the elements that provide the labor in an economic system. It is believed that rules by which labor works are the same as the rules by which each upper level ecological system operates.

Some of the basic terms may be defined:

Work: Any activity performed in an economic system.

Job: The functional objective of work by a resource in an economic system.

Labor: The functional objective of work by a member of a species in an economic system.

Activities may be characterized as nodal or connecting. Connecting activities are situated between nodal activities. Attributes can be assigned to each role. In some embodiments, these attributes can be constant throughout the system.

The system can be configured to include different types of authorizing and connecting roles. In authoritative roles, there can be: 1) the act of signing and 2) the act of validating. In connecting roles, there can be: 1) entrance activities and 2) exit activities.

The authoritative and connecting roles may be further characterized as "originating" or "following." The roles can be considered to a 36-part system, illustrated by a wheel, as in FIG. 5. The characterizations as originating or following can be further divided into primary, secondary, or tertiary.

Through color, shape and number, the tags provide role markers for each activity. These role markers explain an activity's role or function in a particular operation. The avatars explain what an activity actually does in performing its role. The different types of activities, at different levels, can be assigned predetermined colors and symbols. The symbols can enable specific activities to be marked, tracked and compared.

The number scheme can be used to place or locate activities in the system. The role markers explain the role of each location in the overall system. With reference to FIG. 5, using numbers, avatars and role markers, each activity can be differentiated. These parameters indicate an activity's: 1) location; 2) functional job; and 3) functional role.

For example, each system has an internal 36-Part (sequence) set of operating activities. Each sequence in each system has a common role. Together, these common sequential roles produce specific output. The actual activities performed in each part will depend on: (1) The intended product of the specific system, (2) The resources available at the time, (3) The macro-environment in which the activity is being performed, and (4) The macro-environment from which the system came.

These 36 distinct roles exist at each level. Every system in an eco-system has these same distinct 36 roles. In every system, specific activities will differ depending on the system.

OTHER EXAMPLES

The functional information system described herein could be used in predictive modeling, functional positioning, positional operating dashboards, risk management, as well as functional location awareness and cross-system comparisons.

Genetics

It may prove helpful to examine locus/loci/locale terminology as used in genetics—in particular it may be useful as a test of the extent to which the Locus Technology patent is capturing a sufficiently general abstraction to accommodate a gene database.

FIS—The Macro-Economy Overview:

A key benefit of any coordinate information system is the ability to aggregate data for the whole system or any subset. In addition, coordinate information systems provide the ability to compare analogous coordinate sub-sets. This ability to aggregate data systematically based on underlying coordinate values is a valuable benefit of any coordinate-based system such as a GIS System or an FIS System.

A Functional Positioning System (FPS):

A key benefit of any coordinate information system is the ability to go to a specific coordinate and view the information stored at the specific coordinate. Once an application puts a user at a specific coordinate, it also lets the user see and/or interact with the other coordinate value around the specific coordinate. This "Around Me" functionality is very common in GIS Systems for both Business and Weather Applications. This ability to examine whole systems on a point by point basis systematically based on underlying coordinate values is a valuable benefit of any coordinate-based system and is embodied in Positioning Systems like GPS Systems or an FPS Systems.

FIS—Risk Management:

A coordinate system has unique values associated with every coordinate. In operations each coordinate has different risks associated with it. The ability to identify, quantify and manage risks associated with each coordinate is enabled with a coordinate information system.

GIS Systems are used as the basis for risk management in many domains. A well-known example is insurance. Geo-coordinates a statistically relevant with respect to weather and national disasters. GIS Systems are the backbone of insurance companies that deal in insurance associated with these areas.

FIS—Accounting:

Accounting programs all use customer supplied chart of accounts organized by customer designated nominal departments. An FIS system would enable arrangement of the departments, work groups and jobs in a way that was consistent between levels and constant across companies.

FIS—City Planning:

An FIS Cities application would enable cities to compare themselves to other cities. This would enable them to identify peer cities and clusters, to compare their coordinates with other cities and to understand how their city operated as a whole city.

FIS—Corporate Strategy/Business Plan Development:

An FIS system has the capabilities of providing a lab or workbook type environment where a customer could do plan evaluation, plan development and plan modeling. This could all be done in the context of other analogous commercial systems.

FIS—Human Resources:

A key benefit of a coordinate based system is the ability to compare coordinate values on one level to coordinate values on another level. Human resources is an excellent example where that is valuable. Each job has coordinate values on one level. Each enterprise has coordinate values on another level. A functional FIS system would let a user maps specific jobs to specific enterprises. For a given type of company, the system would enable a user to compare the composite of employees within each company.

FIS—Job Training:

A key benefit of a functional coordinate system is the ability is the fact that every coordinate is defined. Every coordinate is populated with information relevant to the specific coordinate. Form a training perspective this enables a customers to train its employees about each job, its responsibilities and how it fits in the overall operations. This would be very valuable to any company and to any current employee and any prospective employee.

FIS—Time And Space:

Every action happens at specific time at a specific space. This is true for any action that takes place at a functional coordinate. That is to say, any functional activity happens at a functional location at a specific time at a specific space. An FIS System adds a new coordinate based location to the temporal location and spatial locations that information systems use. Developing tools that enable a user to set each of these three coordinate-based variables independently would be helpful on many levels. It would enable users to fix any one of the variables and see how its values vary as one or more of the other variables are changed. One could take farming as a functional coordinate. The tool would let the user examine how farming varies by geography and varies by time. A user could examine when were the transforming breakthroughs in technology.

Using geo-coordinates, many companies have built global information systems that populated each geo-coordinate with geo-location based information. For each longitude, latitude or elevation there are large database that contain information related to these values. These databases also adapt as a user navigates these coordinates. As you drive your rental car down a highway the information fed to your car based on your location changes. This is because your car is accessing one of the many global geographic information systems that have been built over the last few decades. If you subscribe to one of these services they will provide you specific information for any geo-coordinate filtered the way you need: e.g.; restaurants, gas stations, intersections, or weather to name a few. This is the benefit of these global geo-information databases. Once built, the application world has seemingly no end in the number of useful "aps" based on these systems and a user's specific location in the system.

The systems disclosed herein can be used to build a global functional information system. Each functional coordinates will be populated with coordinate specific information. Like its GIS counterpart, once built, the application world will also have seemingly no end in the number of useful "aps" based on these systems and a user's specific location in the system. An important one will be this ability to integrate with the already built geo-coordinate information system and the temporal-coordinate information system in a way that would enable a user to navigate all three simultaneously.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Ruby™, Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any operating system or environment executing in a virtualized or non-virtualized environment, using any programming language suitable for software development, including, but not limited to, different versions of Microsoft Windows™, Android™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as PostgreSQL™, MongoDB™, Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method for executing a command in a computing environment to perform a database operation utilizing a computerized representation of a functional system, the method comprising the steps of:

electronically storing a set of data entities in a database system, the data entities representing elements of the functional system;

electronically storing a computerized representation of a functional system syntax, wherein the functional system syntax can be applied by a computer processor to validate expressions of elements of the functional system based on one or more functional attributes;

wherein the functional attributes are properties of the elements of the functional system, and wherein the elements are electronically represented by the data entities in the computerized representation of a functional information system;

wherein the functional information system electronically retrieves data entities in the database system according to functional relationships among the elements defined by roles of the elements in converting inputs to outputs in the functional information system; and enabling data creating, reading, updating, and deleting operations on the data entities in the data store.

2. The method of claim 1, wherein the functional system comprises elements associated with inputs, outputs, intermediates, roles in converting inputs to outputs, or associated with interactions or relationships among the elements; and wherein the data creating, reading, updating and deleting operations correspond to changes in the functional system.

3. The method of claim 1, further comprising assigning syntactic tags to the data entities in the functional information system based on the functional attributes of the elements to which the data entities correspond.

4. The method of claim 3, wherein the tags can be combined, grouped, linked, or ordered to form valid syntactic expressions; and wherein each tag represents one or more activities, functions, inputs, outputs, intermediates, elements, or resources in the functional system;

wherein a locus comprises one or more of the assigned syntactic tags; and wherein the valid syntactic expressions include loci that can be evaluated by the functional system syntax.

5. The method of claim 4, further comprising:

ordering two or more loci by proximity;

wherein the proximity is functional, semantic, temporal, geographic, value chain, positional, or syntactic.

6. The method of claim 5, wherein the proximity is morphological, physiological, anatomical, or physical.

7. The method of claim 4, wherein the tags, functional attributes, elements, expressions, or loci in a field are more homogeneous than an arbitrarily large random sample from the database, as validated by a statistical test.

8. The method of claim 1, wherein:

a resource comprises one or more inputs, outputs, or intermediates in the functional system;

an activity comprises one or more functions in the functional system; and wherein the elements further comprise one or more resources or activities.

9. The method of claim 1, wherein:

the functional system syntax is capable of representation by an n-dimensional coordinate system.

10. The method of claim 9, wherein a set of n values in an n-tuple of tags represents a valid functional location in the syntax representing the functional system.

11. The method of claim 10, wherein any set of positions that has common values represents a common set of valid functional locations in the syntax representing the functional system.

12. The method of claim 1, wherein a barcode comprises a field, and further comprising:

ordering the fields by proximity;

wherein the proximity is functional, semantic, temporal, geographic, positional, value chain, or syntactic.

13. The method of claim 12, wherein the proximity is morphological, physiological, anatomical, or physical.

14. The method of claim 12, further comprising:

ordering the data entities into two or more groups according to syntactic tags, loci, fields, barcodes, or functional attributes;

selecting one of the groups of data entities; and segmenting the selected group of data entities into two or more expressions according to common or proximate syntactic tags, loci, fields, barcodes, functional attributes.

15. The method of claim 14, further comprising:

associating one or more numerical values with each of the expressions and each of the groups;

associating a statistical property with those expressions and groups based on the numerical value;

calculating two or more statistical values associated with the statistical property;

determining the statistical significance of the calculated statistical values of or among each group, tag, attribute, risk exposure, or relationship; and ordering the expressions and groups based on the statistical values or the statistical significance.

16. The method of claim 12, further comprising:

assigning two or more nodes in a graph to one or more tags, elements, attributes, loci, levels, fields or barcodes; and assigning one or more edges in a graph to two or more nodes.

17. The method of claim 16, further comprising:

constructing a visual representation of the graph;

within the visual representation, ordering, weighting, coloring, constructing, or shaping one or more nodes, or one or more edges, based on functional attributes, syntactic tags, relationships in the functional systems syntax, or relationships in the functional system.

18. The method of claim 12, further comprising associating one or more non-functional attributes or non-syntactic tags, markers, values, or other characterization of non-functional or non-syntactic data or metadata with one or more loci, fields, barcodes, or data entities, wherein the one or more non-functional attributes or non-syntactic tags, markers, values, data, or metadata are semantic, demographic, temporal, anatomical, morphological, physiological, or geographic.

19. The method of claim 12, wherein one or more tags, attributes, values, loci, fields, or barcodes are determined by electronically assigning a central role to a primary activity of an element of the functional system.

20. The method of claim 12, further comprising electronically assigning one or more tags, attributes, values, loci, fields, or barcodes to a subset of an element of the functional system.

21. The method of claim 1, wherein the system is economic, financial, monetary, or fiscal.

22. The method of claim 21, wherein a the functional information system comprises syntactic tags of one or more investment securities, and further comprising:

identifying common or proximate syntactic tags; and ordering, grouping, retrieving, searching, analyzing, graphing, querying, or ranking the investment securities based on the common or proximate syntactic tags.

23. The method of claim 1, further comprising constructing or incorporating a semantic or symbolic expression or visual, statistical, numerical, or graphical representation.

24. The method of claim 1, wherein the functional system comprises a group of related elements ordered by functional roles in converting inputs to outputs, or as the inputs, or as the outputs.

25. The method of claim 1, wherein the functional information system is configured to electronically retrieve data entities in the database system according to the roles of the elements in converting the inputs to the outputs.

26. A system for executing a command in a computing environment to perform a database operation utilizing a computerized representation of a functional system, the system comprising:
- an electronic data store configured for:
    - electronically storing a set of data entities in a database system, the data entities representing elements of the functional system;
    - electronically storing a computerized representation of a functional system syntax, wherein the functional system syntax can be applied by a computer processor to validate expressions of elements of the functional system based on one or more functional attributes;
    - wherein the functional attributes are properties of the elements of the functional system, and wherein the elements are electronically represented by the data entities in the computerized representation of a functional information system; and
- a computerized processor configured for:
    - electronically retrieving data entities in the database system according to functional relationships among the elements defined by roles of the elements in converting inputs to outputs in the functional information system; and
    - enabling data creating, reading, updating, and deleting operations on the data entities in the data store.

27. The system of claim 26, wherein the functional system comprises elements associated with inputs, outputs, intermediates, roles in converting inputs to outputs, or associated with interactions or relationships among the elements; and
- wherein the data creating, reading, updating and deleting operations correspond to changes in the functional system.

28. The system of claim 26, wherein the processor is further configured for assigning syntactic tags to the data entities in the functional information system based on the functional attributes of the elements to which the data entities correspond.

29. The system of claim 28, wherein the tags can be combined, grouped, linked, or ordered to form valid syntactic expressions; and
- wherein each tag represents one or more activities, functions, inputs, outputs, intermediates, elements, or resources in the functional system; and
- wherein a locus comprises one or more of the assigned syntactic tags; and
- wherein the valid syntactic expressions include loci that can be evaluated by the functional system syntax.

30. The system of claim 29, wherein the processor is further configured for:
- assigning two or more nodes in a graph to one or more tags, elements, attributes, loci, levels, or fields;
- assigning one or more edges in a graph to two or more nodes.

* * * * *